United States Patent
Gulzar et al.

(10) Patent No.: US 12,355,257 B2
(45) Date of Patent: Jul. 8, 2025

(54) SYSTEMS AND METHODS FOR CONVERTERLESS SOLAR PV OPERATION IN HYBRID RENEWABLE MICROGRIDS

(71) Applicants: KING FAHD UNIVERSITY OF PETROLEUM AND MINERALS, Dhahran (SA); Saudi Data and Artificial Intelligence Authority (SDAIA), Riyadh (SA)

(72) Inventors: Muhammad Majid Gulzar, Dhahran (SA); Muhammad Khalid, Dhahran (SA)

(73) Assignees: KING FAHD UNIVERSITY OF PETROLEUM AND MINERALS, Dhahran (SA); Saudi Data and Artificial Intelligence Authority, Riyadh (SA)

( * ) Notice: Subject to any disclaimer, the term of this patent is extended or adjusted under 35 U.S.C. 154(b) by 0 days.

(21) Appl. No.: 18/647,798

(22) Filed: Apr. 26, 2024

(65) Prior Publication Data
US 2025/0118967 A1    Apr. 10, 2025

Related U.S. Application Data

(60) Provisional application No. 63/589,182, filed on Oct. 10, 2023.

(51) Int. Cl.
    *H02J 3/38*      (2006.01)
    *H02J 3/32*      (2006.01)
    *H02J 7/00*      (2006.01)

(52) U.S. Cl.
    CPC .............. *H02J 3/381* (2013.01); *H02J 3/32* (2013.01); *H02J 7/0048* (2020.01);
(Continued)

(58) Field of Classification Search
    CPC ...... H02J 3/38; H02J 3/381; H02J 7/00; H02J 7/0048; H02J 7/00712; H02J 3/32;
(Continued)

(56) References Cited

U.S. PATENT DOCUMENTS

| | | |
|---|---|---|
| 2005/0198963 A1 | 9/2005 | Wai et al. |
| 2009/0255826 A1 | 10/2009 | McWhinney et al. |
| 2011/0273022 A1 | 11/2011 | Dennis et al. |

FOREIGN PATENT DOCUMENTS

CN              112803573 A      5/2021

OTHER PUBLICATIONS https://www.enfsolar.com/pv/panel-datasheet/crystalline/44069 ; API-M 330-370W 72 Cell, Advance Solar, Hydro, Wind Power, Inc. ; 2 Pages.

(Continued)

*Primary Examiner* — Robert L Deberadinis
(74) *Attorney, Agent, or Firm* — Oblon, McClelland, Maier & Neustadt, L.L.P.

(57) ABSTRACT

A device and method for managing power transmission to a power grid from a Hybrid Grid Connected System (HGCS) is presented. The HGCS includes a plurality of energy resources, including of solar photovoltaic cells (PV), wind power generation, a battery energy storage system (BESS) and a fuel cell system paired with an electrolyzer. Energy sources are connected by a DC-link to a power electronic converter which supplies power to the power grid. A controller is configured to calculate the total power, maximize transmission of power to the power grid from the primary sources, supply the net power to the power grid from the fuel cell system and use the power generated by the PV system and the wind power system for charging the BESS and powering the electrolyzer system based on the relative state of charge of the BESS and the voltage of the DC-link.

20 Claims, 23 Drawing Sheets

(52) U.S. Cl.
CPC ....... *H02J 7/00712* (2020.01); *H02J 2203/10* (2020.01); *H02J 2207/20* (2020.01); *H02J 2300/24* (2020.01); *H02J 2300/28* (2020.01); *H02J 2300/30* (2020.01); *H02J 2300/40* (2020.01)

(58) Field of Classification Search
CPC .............. H02J 2300/28; H02J 2207/20; H02J 2300/40; H02J 2300/24; H02J 2203/10; H02J 2300/30
See application file for complete search history.

(56) References Cited

OTHER PUBLICATIONS

Gulzar et al. ; An Innovative Converterless Solar PV Control Strategy for a Grid Connected Hybrid PV/Wind/Fuel-Cell System Coupled With Battery Energy Storage ; IEEEAccess, vol. 11 ; Mar. 6, 2023 ; 15 Pages.

SYSTEMS AND METHODS FOR CONVERTERLESS SOLAR PV OPERATION IN HYBRID RENEWABLE MICROGRIDS

CROSS REFERENCE TO RELATED APPLICATIONS

The present application claims the benefit of priority to U.S. Prov. App. No. 63/589,182, entitled "Innovative Converterless Solar PV Operation in Hybrid Renewable Microgrids", filed on Oct. 10, 2023, which is incorporated herein by reference in its entirety.

STATEMENT REGARDING PRIOR DISCLOSURE BY THE INVENTORS

Aspects of this technology are described in an article "An Innovative Converterless Solar PV Control Strategy for a Grid Connected Hybrid PV/Wind/Fuel-Cell System Coupled With Battery Energy Storage" published in IEEE Access, vol. 11, pp. 23245-23259, 2023, which is incorporated herein by reference in its entirety.

STATEMENT OF ACKNOWLEDGEMENT

The support provided by the Center of Renewable Energy and Power Systems at King Fahd University of Petroleum and Minerals (KFUPM), Riyadh, Saudi Arabia under Project No. INRE2106 and DAIA-KFUPM Joint Research Center for Artificial Intelligence (JRC-AI), Saudi Arabia is gratefully acknowledged.

BACKGROUND

Technical Field

The present disclosure is directed to renewable energy systems, particularly to load management in hybrid microgrids incorporating renewable energy resources.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Ever increasing utilization of household appliances for routine tasks has significantly enhanced comfort and convenience in daily life, but has led to a higher demand for electricity, resulting a need to increase power output in power generation systems. To meet this demand, both renewable and non-renewable energy sources have been incorporated into the power network. A variety of energy sources, both renewable and non-renewable may be incorporated, but each introduces its own set of complexities into the power distribution system. In response to environmental concerns that have grown over recent decades, efforts have been made to integrate renewable energy sources into national power grid to satisfy the overall electricity demand. Renewable energy sources, such as photovoltaic (PV) panels, fuel cells (FC), ultra-capacitors, wind turbines (WT), and geothermal energy, are being integrated into the existing power generation infrastructure to promote the use of clean and sustainable energy. Among these, solar panels and wind turbines are the most commonly utilized renewable energy sources due to well developed installation processes and operational cost-efficiency ratio. Renewable energy sources are being adopted worldwide because they generate power without the need for fuel, unlike other options such as fuel cells and biogas systems.

Due to recent advancements in wind turbine technology, especially in offshore installations, wind turbines are considered a reliable energy resource for power generation. One efficient method of power generation involves using Doubly Fed Induction Generators (DFIGs), which regulate the wind turbine speed, resulting in the optimization of power output through Maximum Power Point Tracking (MPPT). The MPPT adjusts the speed of the rotor based on wind conditions. Over the past decades, researchers have developed various control strategies to enhance the efficiency of DFIG-operated wind turbines. Control algorithms are aimed at reducing the transient oscillations caused by wind speed fluctuations, which impact the stator of the generator. Further, voltage conditioning is needed that minimizes current and voltage harmonics, thereby stabilizing active and reactive power outputs in DFIG systems.

Another renewable energy resource, the photovoltaic (PV) array, generates electricity without contributing to noise, air pollution, or requiring substantial mechanical upkeep. The establishment of large-scale PV farms, capable of generating several gigawatts of power, can meet the increasing electricity demand. The integration of electricity from PV arrays into the power grid is achieved through either a single-stage or a two-stage topology. The single-stage approach uses fewer converters and switches, but requires a more complex control system than the two-stage method. Voltage source inverters (VSI) are commonly employed in both topologies to facilitate the injection of power into the grid, ensuring a seamless integration of solar-generated electricity with existing power networks.

Energy storage technologies offer a solution to mitigate the erratic nature of wind and solar power generation, enabling effective management of voltage, frequency, and phase variations in the power grid. This facilitates the stable integration of large-scale wind and solar photovoltaic systems. Among these technologies, electrochemical energy storage stands out for its quick response, durability, safety, and versatility.

Hydrogen energy is recognized for its high energy storage density and clean, pollution-free characteristics. Hydrogen energy generation is emerging as a key clean energy resource globally, with significant industrial development. Hydrogen, especially when combined with hydrogen fuel cell systems for backup power, provides a robust enhancement to energy stability, supporting the continuous power supply for regional grids.

Rather than utilizing the renewable energy resources individually, hybrid power generation systems (HPGS) combine two or more renewable energy resources to provide more stable and robust energy generation systems. HPGS integrates photovoltaic (PV) panels and wind turbines, which are being implemented for power generation because of the economic and environmental advantages. The power grids attached to PV and wind turbines show greater stability due to the complementary power generation and can be installed in different weather conditions. Specifically, solar energy production peaks during the day, while wind energy production increases at night or during periods with higher wind speeds. HPGS extends power generation across seasons, with higher solar output in summer and increased wind energy in winter, prompting efforts to integrate these energy sources effectively.

However, integrating solar and wind energy into the power grid introduces challenges related to power quality, system reliability, and stability. Electrical energy storage systems (EESS) can be implemented to mitigate these challenges by reducing power fluctuations and improving energy quality and balance. The EESS can ensure consistent electricity supply, particularly during periods of high demand or limited generation from other sources.

The EESS technologies vary widely, including high-power options like supercapacitors, superconducting magnetic energy storage (SMES), batteries, and flywheels for immediate response needs, and others aimed at longer-term energy management, such as fuel cells, large-scale batteries, solar cells, and flow batteries. The storage systems can store electrical power in various forms, such as chemical, thermal, or mechanical energy, and convert it back to electrical energy when needed.

The implementation of a hybrid energy storage system (HESS) maintains the autonomy of hybrid grid systems by compensating for power variations. The life expectancy of the storage systems is significantly influenced by the frequency of their charge and discharge cycles. Therefore, enhancing the reliability of the energy supply from PV and wind turbine systems necessitates the incorporation of a third energy source. The third energy source system needs to be chosen according to the advantages and form of the storage system.

Recent developments have considered the enhancement of existing wind turbines with photovoltaic systems requiring minimal structural changes. Some methods have utilized a three-phase square wave converter to merge photovoltaic and wind energy into a unified solar wind system. Some other methods have introduced a three-input direct current to direct current (DC-DC) boost converter designed to power direct current loads within a hybrid setup. Yet, the implementation of these converters within a hybrid arrangement often presents financial challenges.

To improve grid-connected photovoltaic/wind power generation systems, stabilization of DC-link voltage fluctuations and minimization of the required size for DC-link capacitor banks are needed. Additionally, management of the state of charge of the battery storage system can be implemented to curtail output power variability within hybrid systems. Various such methods have been formulated for the analysis and optimization of hybrid configurations, particularly through the use of battery systems.

Few recent techniques have been directed toward developing advanced control strategies for hybrid systems. The strategies include modified control algorithms implemented for mitigating fluctuations in both active and reactive power within the hybrid system, with a particular focus on specific grid voltage harmonics. Various control schemes have been designed for wind farms using DFIGs, integrating super-capacitors as an energy storage solution. Furthermore, few energy management and control systems have been experimented with for configurations combining DFIGs, photovoltaic arrays, and battery banks. These systems include a control loop specifically for the battery bank. In one exemplary method, an embedded energy sharing technique between the battery and super-capacitors was suggested, where the supercapacitors are designed to meet peak power requirements whereas the battery fulfills average power. In one design, the battery connects to the DC bus via a DC-DC buck-boost converter, while another design omits this converter. DC-DC converters have also been employed between the DC bus and super-capacitors to facilitate power exchange.

Additionally, a method has been developed for providing voltage and frequency support to an islanded microgrid by coordinating and integrating the operation of solar PV generators with MPPT control and battery storage control. The method uses a control loop technique for the battery energy storage management. In addition, photovoltaic systems with integrated MPPT and combined active and reactive power control have been implemented for systems connected to the grid. Such control algorithms are implemented to ensure coordinated management of inverters, charging and discharging control of energy storage, and MPPT control.

CN112803573A describes a wind-light hydrogen storage complementary uninterrupted power supply system, comprising a wind power generation system, a photovoltaic power generation system, a control system, an inverter system, an energy storage battery system, a hydrogen fuel battery spare power generation system, and a hydrogen production system.

US20110273022A1 describes a hybrid power system in which each generating source is connected to a converter, which is coupled to a DC bus. The generating source may be wind, photovoltaic, hydroelectric, fuel cell, tidal, biofuel, or biomass generating sources. Each of these sources generates power which is output as either an AC or a DC voltage with an amplitude suited to the type of generating source.

US20050198963A1 describes a hybrid clean-energy power-supply framework that integrates a fuel cell, solar cell, and wind energy, applies a max power tracking rule, raises the output power of a solar cell and wind energy to supply a power load, and transfers the surplus electrical energy to a water-electrolyzing apparatus for producing hydrogen and oxygen, and provides a fuel for a fuel cell power generating system US20090255826A1 describes an electrical power selection and conditioning module that enables a hydrogen system to provide DC electricity from a variety of sources which include solar panels, wind turbines, and batteries. Excess hydrogen generated by an electrolyzer can fill a hydrogen storage unit and power a fuel cell with the excess hydrogen.

Each of the aforementioned disclosures suffers from one or more drawbacks hindering their adoption. The one or more drawbacks include, but may not be limited to, the complex interconnected control of various energy resources, the absence of a third energy resource, such as an electrolyzer, used as an energy storage/generator, and efficient implementation of the BESS. The existing technologies are not adequately efficient, optimized, and focused on the control design and power energy sources coordination. Further, optimization for hybrid energy system efficiency has not been considered.

Accordingly, it is one object of the present disclosure to provide methods and systems for establishing an efficient and cost-effective configuration that unifies photovoltaic components, with energy storage systems using Doubly Fed Induction Generators, fuel cells, and electrolyzers, in a streamlined approach to control. It is another object of the present disclosure to perform common AC and DC bus voltage and MPPT by the controller of a grid side controller. It is yet another object of the present disclosure to minimize GSC power and DC link voltage fluctuation to a large extent. One more object is to present a new topology for hybrid Wind, PV, BESS and fuel cells (FC) with an electrolyzer to achieve optimal and efficient control of the different sources, ensuring better power quality for the AC grid, regulating the voltage level and the frequency of AC grid, ensuring continuity of the service. Yet another object is to provide implementation and integration of the FC and the electrolyzer to make the system more sustainable when wind and solar PV power depend on weather conditions and during night hours solar power is zero. Therefore, under long-term conditions of no-wind or low-wind incorporated with PV, the BESS alone cannot meet the load demand. Accordingly, it is an object of the present disclosure to provide frequency support to the AC side of the grid while ensuring stable operation of the DC side of the grid.

SUMMARY

In an exemplary embodiment, a hybrid grid connected system (HGCS) for managing power transmission to a power grid from a plurality of power generation sources is described. The HGCS includes a plurality of electrical generation sources including a primary source comprising a solar photovoltaic cell (PV) system and a wind power generation system, a secondary source comprising a battery energy storage system ("BESS") and a tertiary source comprising a fuel cell system operatively connected to an electrolyzer system, a DC-link connected to a power electronic converter of the HGCS, wherein the HGCS is connected to the power grid, wherein each of the plurality of electrical generations sources is connected to the DC-link, wherein the power electronic converter is configured to transmit power generated from the plurality of electrical generation sources to the power grid, wherein the DC-link is located between a rotor side converter (RSC) and a grid side converter (GSC), a voltmeter configured to measure the voltage between the positive rail and the negative rail of the DC-link, a power meter connected to the DC-link, wherein the power meter is configured to measure a net power in the DC-link, a controller connected to the power electronic converter, wherein the controller includes electrical circuitry, a memory storing program instructions and at least one processor configured to execute the program instructions to: maximize transmission of power to the power grid from the primary sources relative to the secondary source and the tertiary source via the GSC; supply the net power to the power grid from the fuel cell system when the voltage of the BESS is less than a reference voltage of the DC-link, and use the power generated by at least one of the PV system and the wind power generation system for powering one of the BESS and the electrolyzer system based on the voltage of the DC-link being greater the reference voltage of the DC-link.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
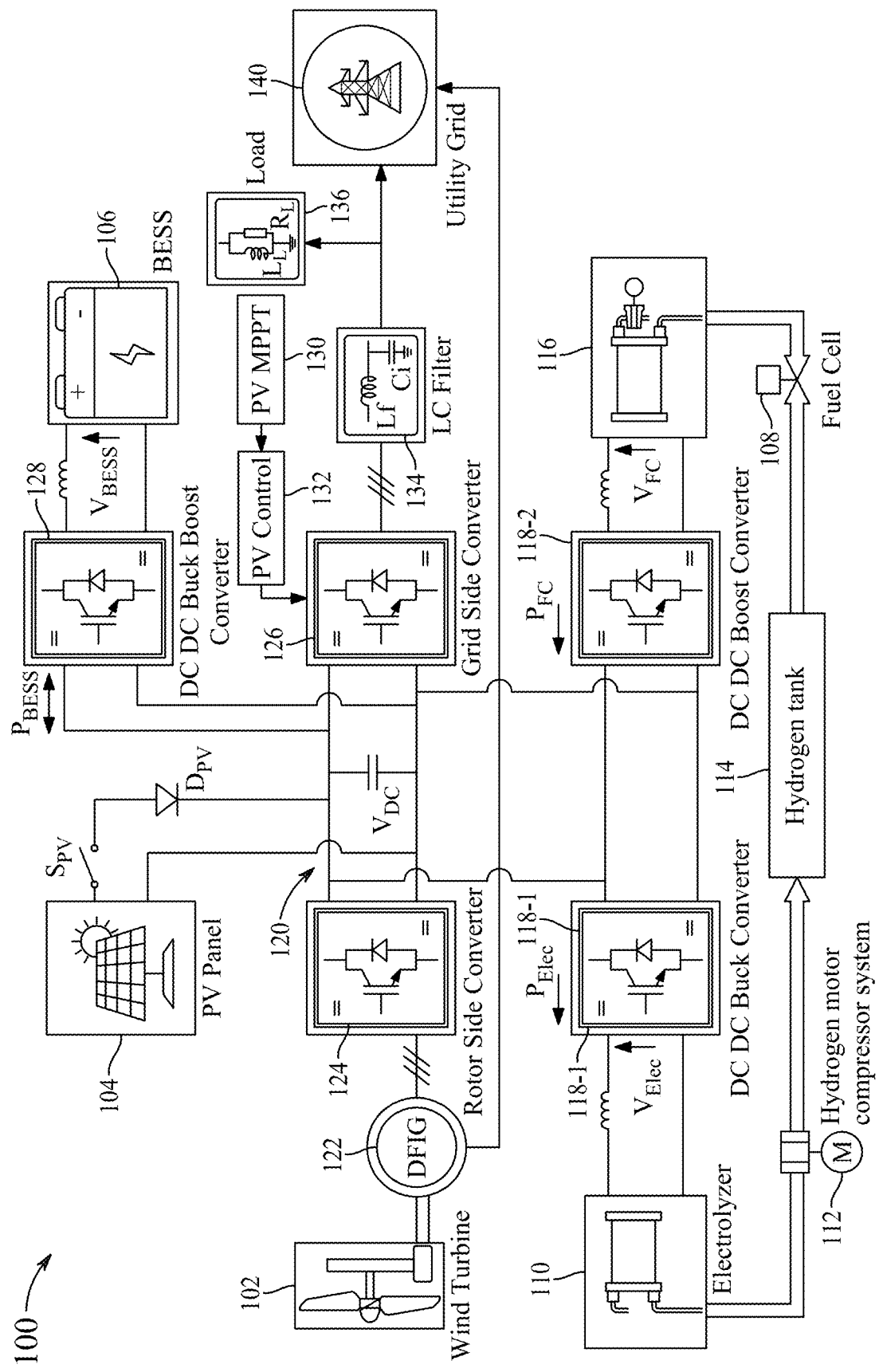
FIG. 1 illustrates a hybrid grid-connected system (HGCS) configured for managing power transmission to a power grid from a multitude of power generation sources, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a system, device, and method to manage the efficiency and utilization of renewable and conventional energy generators. The system includes a wind energy converter in the form of a doubly fed induction generator (DFIG), photovoltaic (PV) panels for solar energy conversion, a battery energy storage system (BESS) for energy storage and supply stability, and a fuel cell with an electrolyzer as a tertiary source of energy.

The hybrid system is controlled through a number of loops and converters, where the loops and converters have streamlined architecture and reduced complexity, which render power stability within the grid-connected system and adjust to fluctuations in wind and solar power availability. The present disclosure increases the capacity of the PV panels to exceed the rating of the grid side converter GSC without the necessity of a separate PV converter, thus making better use of capabilities of the combined converter.

The BESS compensates for the intermittent nature of wind and PV energy, mitigating the effects of low energy input on overall system performance. The BESS also contributes to a reduction in the size of the required DC link capacitor. However, the lifetime of the BESS is balanced against its charge-discharge cycles, which necessitates an additional energy source for long-term sustainability and reliability. The addition of a fuel cell and an electrolyzer to the system provides a continuous energy flow, complementing the BESS and accommodating for periods of low wind and solar generation. This tertiary source ensures that the system can meet load demands consistently, even under adverse weather conditions, thereby enhancing the reliability of the grid-connected system.

FIG. 1 illustrates a hybrid grid-connected system (HGCS) configured for managing power transmission to a power grid from a multitude of power generation sources. In one aspect of the present disclosure, the HGCS is configured for connecting a plurality of electrical generation sources to a DC-link of a power electronic converter of the HGCS connected to the power grid. The plurality of electrical generation sources includes a primary source comprising a solar photovoltaic (PV) system 104 and a wind power generation system 102, a secondary source consisting of a battery energy storage system (BESS) 106, and a tertiary source comprising a fuel cell system 108 operatively connected to an electrolyzer 110.

In a zone aspect, the HGCS 100 is an interconnected network of renewable and conventional energy sources, managed by control systems to ensure efficient energy utilization and storage. The HGCS 100 can operate independently from the main utility grid or be integrated to provide backup during grid instability or curtailments.

The selection of energy sources for the HGCS 100 is based on the availability of various renewable resources at the specific location, such as solar radiation, wind speed, geothermal, or hydropower. Renewable sources are designed to produce surplus electricity during peak demand periods, rendering a portion of this energy to be stored for use when renewable energy is intermittent, such as solar energy at night or during wind lulls. The hybrid microgrid includes a battery energy storage system (BESS) 106 which charges to store excessive grid electricity generated to use during grid curtailments or instability. In one aspect of the present disclosure, the HGCS 100 is configured to generate the electricity utilizing the PV system 104, the wind power generation system 102, the BESS 106, and a fuel cell system 108 operatively connected to an electrolyzer 110.

The solar PV system 104 comprises a series of solar cells, each designed to convert solar energy directly into electrical energy via the photovoltaic effect. These cells utilize semiconductor materials selected for their high efficiency in absorbing solar radiation and converting it into electrical current.

In conjunction with the PV system 104, the wind power generation system 102 is implemented. The wind power generation system 102 consists of turbines that convert the kinetic energy of wind into electrical energy. The output of the turbines is dependent upon wind speed, blade dimensions, and air density, factors meticulously considered in the design and placement of the turbines to maximize energy capture.

As a secondary source within the system, the BESS 106 is implemented as an energy repository and energy source. The BESS is connected to the DC-link. The BESS 106 is configured for storing excess electrical energy during periods of high renewable energy generation and providing energy during periods of low generation or high demand. The stored energy in the form of direct current (DC) electricity, is retained within batteries for subsequent utilization. During intervals characterized by low renewable energy generation or heightened energy demand, the BESS 106 is utilized as an energy source. It releases stored electricity, thereby supplementing the grid and ensuring continuity of power supply, even amidst fluctuations in renewable energy availability.

The integration of the BESS 106 contributes significantly to grid stability. Due to its rapid-response energy storage capabilities, the BESS 106 can quickly discharge stored energy to counterbalance the fluctuations in supply and demand. This mitigates the necessity for conventional, less sustainable peak-load power plants. Furthermore, BESS systems facilitate peak shaving by storing electricity during periods of low demand and subsequently discharging it during peak demand instances. Such optimization assists utilities in effectively managing peak loads and mitigating associated costs. In parallel, the BESS 106 synergizes renewable energy sources, mitigating their inherent variability and intermittency. By storing surplus energy during periods of abundance and releasing it during deficits, the BESS 106 optimizes the utilization of renewable energy resources.

The tertiary energy generation resources within the HGCS 100 include the fuel cells 108 and electrolyzers 110. The fuel cells 108 may be a plurality of fuel cells arranged in a fuel cell bank. Similarly, the electrolyzers 110 may comprise a plurality of electrolyzers which are connected to the fuel cells 108. The fuel cell system is connected to the DC-link. The electrolyzer (110) is configured for utilizing excess electrical energy to electrolyze water, effectively splitting it into its constituent elements: hydrogen and oxygen. This transformation represents a method of storing surplus electrical energy in chemical form.

Subsequently, the hydrogen generated from the electrolysis process serves as the primary resource for the fuel cell system 108. The hydrogen undergoes conversion back into electrical energy via an electrochemical reaction with oxygen. This conversion occurs within the fuel cell system 108, where electricity is produced alongside water and heat as by-products.

Referring to FIG. 1, a DC-link 120 is connected to a power electronic converter of the HGCS 100. In one aspect of the present disclosure, the DC-link 120 is located between a rotor side converter (RSC) 124 associated with the wind turbine 102 and a grid side converter (GSC) 126. The DC-link 120 is configured for connecting the power electronic converter components of the system and facilitating the transmission of power generated from the various electrical generation sources to the power grid 140. The PV system 104, wind power generation system 102, the BESS 106, and the fuel cell system 108 with the electrolyzer 110 are all connected to the DC-link 120.

The rotor side converter (RSC) 124 is configured to regulate the alternating current (AC) power generated by the rotor of the rotor of the wind turbine. The RSC 124 modulates the electrical output from the rotor by adjusting the torque of the generator in response to fluctuating wind velocities, thereby optimizing the efficiency of the wind turbine. The RSC 124 converts the variable AC to a direct current (DC), suitable for integration into the DC-link 120.

The grid side converter (GSC) 126 interfaces the HGCS 100 to the utility grid. The GSC 126 converts the DC voltage from the DC-link 120 into an AC voltage that aligns with the operational standards of the grid, ensuring that the frequency and phase of the electrical power are synchronized with the grid. The synchronization results in the coherent and stable delivery of power to the grid.

A voltmeter 128 is configured to accurately measure the voltage across the positive and negative rails of the DC-link 120, ensuring voltage levels are kept within prescribed safe limits. The HGCS 100 also includes power meters 118-1, 118-2 connected to the DC-link 120 for measuring net power, enabling the system to effectively track and optimize the maximum power point (MPP) of the PV system 104.

The controller 132, equipped with the necessary electrical circuitry, memory, and at least one processor, is configured for executing program instructions. These instructions direct the controller 132 to maximize power transmission to the power grid 140 from the primary sources relative to the secondary and tertiary sources via the GSC 126. Additionally, the controller 132 manages the supply of net power from the fuel cell system 108 when the voltage of the BESS 106 is below the reference voltage of the DC-link 120. The controller 132 is further configured to receive the power generated by the PV system at the DC-link, receive the voltage of the DC-link, receive the net power of the DC-link, calculate a sum of the powers of the PV system, the BESS, the wind power generation system and the fuel cell system, and compare the voltage of the DC-link to the reference voltage of the DC-link. When the DC-link voltage exceeds the reference voltage, the controller 132 utilizes the power generated by the PV system 104 and the wind power generation system 102 to store the power within the BESS 106 and the electrolyzer 110.

The BESS 106 is connected to the DC bus via a DC/DC buck-boost bidirectional converter 128, which controls the charging and discharging processes based on the state of charge of the BESS 106. The DC/DC buck-boost bidirectional converter 128 is a type of power electronic device that can regulate and convert the voltage level between two DC sources in both directions. The DC/DC buck-boost bidirectional converter 128 can either step down (buck) or step up (boost) the voltage from the input to the output side, depending on the operational requirements. The bidirectional functionality can control the flow of power in two directions, can charge a battery or a storage system by stepping down the voltage from a DC source, and can also extract energy from the storage system by boosting the voltage to a higher level suitable for a load or further distribution.

In one aspect of the present disclosure, an electrolyzer 110 is activated to store surplus energy in the form of hydrogen in a hydrogen tank 114 when the BESS 106 reaches its charge storage threshold due to high-power generation from the PV and wind sources.

The controller 132 is further configured to use a portion of the net power to recharge the BESS 106 when its state of charge is below a first threshold. Any excess net power is then directed to the electrolyzer 110 once the state of charge of the BESS 106 meets or exceeds this first threshold. In a non-limiting example, the first threshold is about 20% of the fully charged state of the BESS 106.

In one aspect of the present disclosure, the controller 132 is further configured to supply the net power to the power grid from the BESS based on a state of charge of the BESS being within a specified range and supply the net power to the power grid from the fuel cell system based on the state of charge of the BESS being outside of the specified range. When the state of charge of the BESS 106 is within a certain range, the controller 132 channels the net power to the power grid 140 from the BESS 106. If the state of charge falls outside this range, the net power is supplied to the power grid 140 from the fuel cell system 108. In a non-limiting example, if the state of charge of the BESS is equal to or greater than the first threshold of about 20% and less than or equal to a second threshold of about 80% of the fully charged state of the BESS, the net power is sourced from the BESS 106. When the state of charge of the BESS falls below about 20%, the fuel cell system 108 takes over and if the state of charge of the BESS exceeds about 80%, the electrolyzer 110 is engaged.

The controller 132 is further configured for powering the electrolyzer 110 with the remaining net power to produce hydrogen, which is stored in the hydrogen tank 114 for future use by the fuel cell system 108.

The HGCS 100 further includes an anode of the fuel cell 108 connected to receive oxygen from an air compressor, and a cathode connected to receive hydrogen from the hydrogen tank 114. In an aspect, the oxygen generated by the electrolyzer may be stored in an oxygen tank (not shown) and sourced from the oxygen tank by the air compressor. In another aspect, the oxygen stored in an oxygen tank may be a product of the HGCS 100 which can be marketed. In an aspect, the oxygen generated by the electrolyzer may be released into the atmosphere. The fuel cell 108 can generate electricity from the hydrogen stored in the hydrogen tank 114 and supply the electricity to a DC-DC buck-boost converter 118-2, which can supply the fuel cell power PFC to the GSC 126, which in turn delivers it to the power grid 140 when the voltage at the DC-link 120 is less than the reference voltage and the state of charge of the BESS 106 is below 20%.

For the BESS 106, a positive output terminal is connected to a first inductor, which is connected to a positive (+) input terminal of a DC/DC buck-boost converter 128. The negative (−) output terminal of the BESS 106 is connected to a negative input terminal of the converter 128. The positive and negative output terminals of the DC/DC buck-boost converter 128 are connected to the positive rail (shown as the upper rail of the DC-link 120) and to the negative rail (shown as the lower rail of the DC-link 120), respectively. A positive input terminal of a DC-DC buck converter 118-1 is connected to the positive rail of the DC-link. A negative input terminal of the DC-DC buck converter 118-1 is connected to the negative rail of the DC-link. A positive output terminal of the DC-DC buck converter 118-1 is connected to a second inductor. An anode of the electrolyzer 110 is connected to the second inductor. A negative output terminal of the DC-DC buck converter 118-1 is connected to a cathode of the electrolyzer, where the electrolyzer is configured to generate hydrogen and oxygen gases when the state of charge of the BESS is greater than the second threshold of about 80%. The hydrogen tank 114 is configured to store the hydrogen generated by the electrolyzer.

Additionally, the HGCS includes a wind power generation system connected to a doubly fed induction generator (DFIG) 122. A first output terminal of the DFIG 122 is connected directly to the utility grid 140. A second output terminal of the DFIG 122 is connected to the rotor side converter (RSC) 124. The wind turbine generates active (DC-DC) and reactive (AC) power based on ambient wind flow conditions. The active power is transmitted to the DC-link and may be stored in the BESS based on one of the SOC of the BESS being less than the first threshold. The reactive power is transmitted to the DC link and passed to the grid side converter 126 for use in powering reactive load 136 or to balance a set of reactive components at the utility grid being less than or greater than a reactive reference threshold. The RSC 124 is engaged based on specific conditions related to the state of charge of the BESS 106 and reactive power requirements at the DC-link 120.

In one aspect of the present disclosure, the PV controller 132 controls the electrolyzer 110, which is selected from among various types such as solid oxide, alkaline, or membrane electrolyzers. The fuel cell system 108, which may include a solid oxide fuel cell, is connected to receive hydrogen from the hydrogen tank 114, completing the capability of the system to provide an alternative power source when traditional renewable sources are insufficient.

In one aspect of the present disclosure, the controller 132 is connected to the GSC 126 and is configured for the overall management of the PV system 104. It regulates the operational parameters of the PV system, ensuring that it functions within safe and optimal conditions. The control system orchestrates the flow of electricity from the solar panels, manages the charge state of connected storage devices like the BESS 106, and oversees the integration of solar power into the larger energy system of the HGCS 100.

The PV maximum power point tracking (MPPT) 130 is a control algorithm that operates in conjunction with the controller 132. The PV MPPT 130 is configured to maximize the energy harvest from the photovoltaic panels. Photovoltaic panels have a specific point on their power-voltage curve where the product of current and voltage is at its maximum, known as the maximum power point (MPP). The MPPT 130 continuously tracks this point to adjust the electrical load of the photovoltaic panels dynamically, ensuring that the panels are always operating at their most efficient point regardless of environmental conditions like sunlight intensity and temperature. In response, the photovoltaic panels may physically rotate to absorb a maximum amount of sunlight.

The LC filter 134, in one aspect of the present disclosure, includes an inductor (L) and a capacitor (C) which serves to smooth out the power output from the PV panels 104 and the wind turbine 102 before it is either used by the load 136 or fed into the utility grid 140. The LC filter 134 filters out unwanted electrical noise and harmonics from the output of the GSC 126, which is particularly important for maintaining the quality of the AC power generated by the wind turbine 102. By doing so, the LC filter 134 helps to prevents potential disturbances or interference with other equipment connected to the HGCS 100 and ensures compliance with grid regulations regarding power quality.

The HGCS 100 thus provides a comprehensive energy solution that adeptly manages the variability of renewable energy sources, ensuring the provision of a consistent and dependable power supply.

Each energy resource of the HGCS 100 is modeled and is described subsequently.

The PV array consists of numerous solar cells that produce electrical charge carriers when exposed to light. If the photon energy exceeds the band gap of the semiconductor, the photon energy dislodges electrons, generating a current. Poly-crystalline solar cells are recognized for their cost-effectiveness and accessibility, alongside conventional mono-crystalline solar cells, and either may be included in the PV array. Extensive research has aimed to refine solar equations to more accurately reflect real-world cell behavior. However, the performance characteristics of PV array cells often diverge from the ideal. A PV array includes a diode in parallel with a current source. As depicted in the equivalent circuit for a single solar cell 200, shown in FIG. 2, each solar cell includes a current source in conjunction with a Shockley diode, augmented by a parallel resistance, denoted as $R_{per}$, and a series resistance, $R_{ser}$. The aggregate current produced by the solar cell is the sum of the diode current and the current source.

The mathematical expression for single solar cell is illustrated as:

$$I = I_{PV} - I_o\left[e^{qV/akT} - 1\right]; \qquad (1)$$

where, I is the single solar cell current, $I_{PV}$ is the solar irradiation total generated current, $I_o$ is reverse leakage current (saturation), a is a diode factor, T is a diode temperature (Kelvin), q is the electron charge and k represents the Boltzmann constant.

All features of the solar cell are not presented in equation (1) for a single solar cell. Inculcation of both series and parallel resistances can be included, particularly for empirical conditions. The output current of a photovoltaic panel incorporating the series and parallel resistances is given by:

$$I = I_{PV} - I_o \left[ e^{\frac{V+R_{ser}I}{V_t a}} - 1 \right] - \left( \frac{V + R_{ser}I}{R_{per}} \right); \quad (2)$$

where $I_{PV}$ is the current of the PV array, $R_{ser}$ is the total series resistance between the solar cell and terminal connection, $R_{per}$ is the total parallel resistance, $V_t$ is the thermal voltage and can be further calculated using expression, VT=kTq where V is the combined terminal voltage of the solar cells, k is the Boltzmann constant, $8.6173 \times 1^{-5}$ ev/K, K is the absolute temperature in Kelvin and q is the elementary charge, $1.602 \times 10^{-19}$ C. $R_{per}$ is the resistance produced from the p-n junction leakage current.

On the basis of the parallel and series configurations solar cells of the PV array, equation (2) can be modified. If the number of parallel cells is increased, the current level of a PV array is also increased. Similarly, when the number of series cells is increased, the voltage of a PV array is also increased.

Charges produced because of temperature and solar irradiation is $I_{PV}$ dependent as given by equation (3):

$$I_{pv} = (I_{pvn} - K_i \Delta T) G / G_n \quad (3)$$

As the parallel resistance of the solar cell is greater than series resistance thus, the short current is approximately equal to the PV threshold current. $I_{pvn}$ is threshold PV current, $K_i$ is current coefficient, T is difference between the nominal and actual temperature K: $T_n$–T, G is incident solar radiation and $G_n$ is nominal solar radiation. Units of $G_n$ and G are W/m². Much work has been done in this domain and many formulas for features of solar cells and their designs have been developed by researchers. Equation (3) gives an insight into the characteristics of the solar cells. Open circuit voltage and wide temperature variation are included.

$$I_{on} = \frac{I_{sen} + K_i \Delta T}{e^{\left(\frac{V_{ocn} + K_v \Delta T}{a V_t}\right)} - 1}; \quad (4)$$

where $V_{ocn}$ is an open circuit nominal voltage, $K_v$ is a voltage coefficient, $I_{scn}$ represents a nominal short-circuit current, α is an ideal diode factor, $V_t$ is the thermal voltage. For modeling solar cells, equations (1), (2) and (3) are used together. Temperature and irradiation are the factors that have a direct relation to the operation of the solar cell. PV simulation is carried out with the help of the above mentioned equations. The features of the system are similar to the functional PV series.

The wind turbine energy can be calculated as described below. The aerodynamic power of the wind turbine is illustrated as:

$$P_{rm} = \frac{1}{2} \rho C_p(\beta, \lambda) A v_t^3; \quad (5)$$

where, $P_{rm}$ represents mechanical power generated by the wind turbine, $V_t$ is the wind speed, $C_p$ shows the power coefficient, λ is the speed ratio, β represents the blade angle and A is the area of the rotor blades.

In the hybrid system of the present disclosure, voltage-flux equations in the d-q reference frame are used to regulate the DFIG. In the equations, the d-axis of the frame has an alignment with the flux space vector of the stator that further rotates with synchronous speed. In terms of rotor current components, the equation of rotor and stator can be represented as:

$$\sigma L_r \frac{di_{dr}}{dt} = -R_r i_{dr} + \omega \sigma L_r i_{qr} + v_{dr} - \frac{L_m}{L_s} \frac{d}{dt} \varphi_{ds}; \quad (6)$$

$$\sigma L_r \frac{di_{qr}}{dt} = -R_r i_{qr} + \omega \sigma L_r i_{dr} + v_{qr} - \frac{L_m}{L_s} \frac{d}{dt};$$

where rotor current and terminal voltage components are $V_{qr}$, $V_{dr}$, $i_{qr}$ and $i_{dr}$ respectively, $\omega_r$ and $\omega_o$ are rotor and synchronous speeds (rad/sec) and $\omega = \omega_o - \omega_r$. The components of star flux in a d-q reference frame are represented by $\varphi_q$ and $\varphi_{ds}$. $R_r$ represents rotor winding resistance. σ is the leakage component which is mathematically expressed as:

$$\sigma = \frac{L_r L_s - L_m^2}{L_s L_r}; \quad (7)$$

where $L_r$, $L_m$, and $L_s$ represent various inductance. $T_e$ represents electromagnetic torque of machine given as:

$$T_e = -p \frac{3 L_m v_{ms}}{2 L_s \omega_0} i_{qr}; \quad (8)$$

where, $v_{ms}$ represents the amplitude of stator voltage. $P_e$ denotes electromagnetic power that can be expressed mathematically as:

$$P_e = -\frac{3 L_m \omega_r}{2 L_s \omega_0} v_{ms} i_{qr}; \quad (9)$$

Using equation (9), rotor power ($P_r$) and stator power ($P_r$) equations are given as:

$$P_e = -\frac{3 L_m}{2 L_s} v_{ms} i_{qr}. \quad (10)$$

Figure 2:
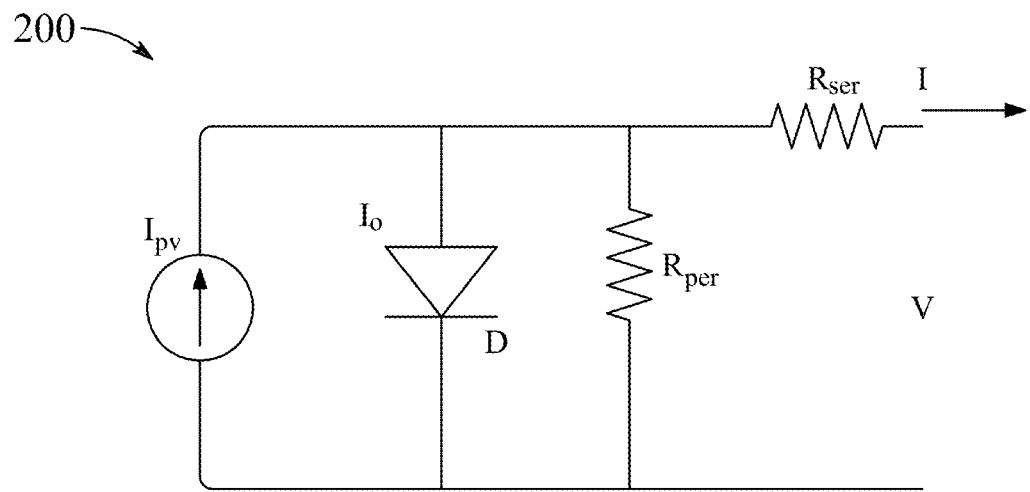
FIG. 2 illustrates an equivalent circuit diagram for a single solar cell, according to certain embodiments.

FIG. 2 presents the equivalent circuit diagram for a single solar cell. The solar cell 200 illustrates the electrical characteristics of the cell under various conditions of light and temperature.

In one aspect of the present disclosure, the solar cell 200 includes a current source $I_{pv}$, representing the photocurrent produced by the solar cell 200 when it is exposed to sunlight. The current source $I_{pv}$ is the primary generator of electrical current within the solar cell as a result of the photovoltaic effect.

The diode D is placed in parallel with the current source symbolizes the p-n junction of the solar cell 200, letting current to flow more easily in one direction than the other.

The solar cell 200 further includes the series resistor $R_{ser}$ and the shunt resistor $R_{per}$. The series resistor $R_{ser}$ is connected in series with the current path and is attributed for the internal resistive losses of the solar cell, which affect the flow of current through the cell. The losses can be due to impurities in the material, defects, or contact resistance leading to reduction on efficiency of the cell efficiency.

The shunt resistor $R_{per}$, depicted in parallel with both the diode D and the current source, represents the leakage current paths within the solar cell 200. The shunt resistance attributes the non-ideal behaviour of the solar cell where, under certain conditions, some current bypasses the load and flows directly from the positive to the negative side of the cell.

Figure 3:
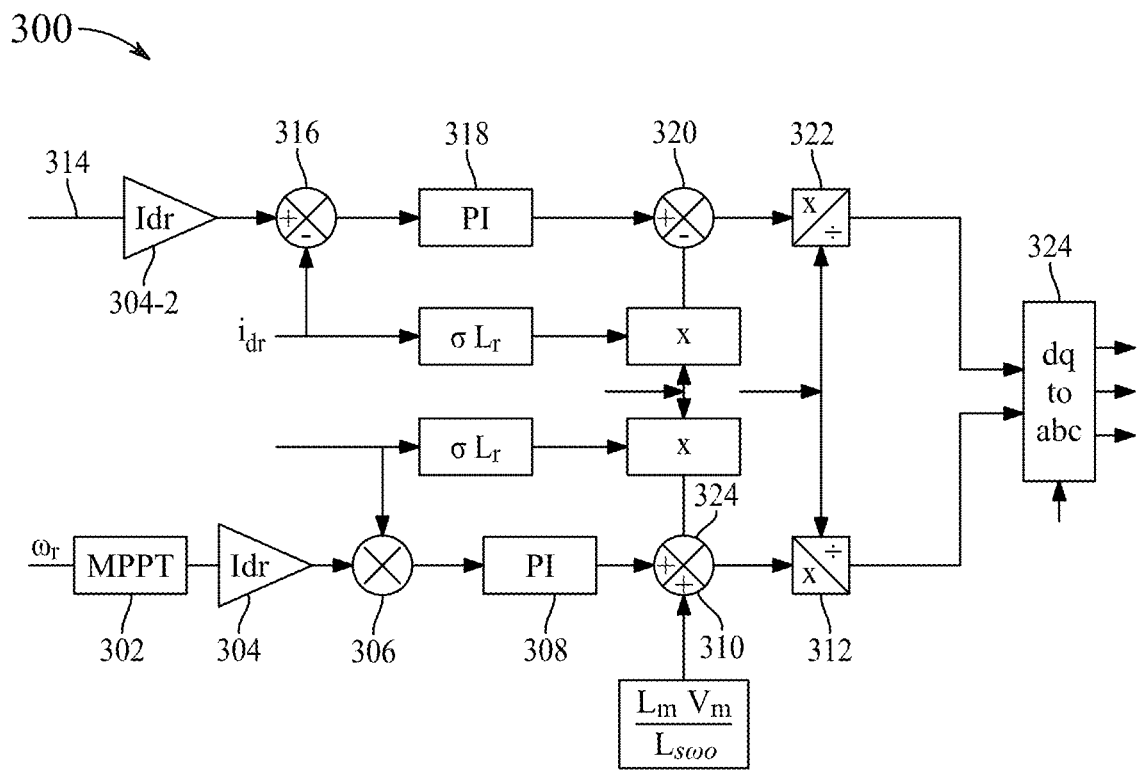
FIG. 3 illustrates a schematic diagram of a control system for a rotor side converter (RSC), according to certain embodiments.

FIG. 3 illustrates a schematic diagram of a control system of the RSC. The control system 300 is configured to control the DFIG used in wind turbines.

The control system 300 includes an MPPT 302 which optimizes the conversion of wind energy into electrical power by adjusting the operational parameters to maximize power output. The rotor speed reference ($\omega_r$) is input to the MPPT 302, indicating the rotational speed of the rotor of the wind turbine. The output from MPPT 302 is then fed into the rotor side converter control block 304, which regulates the power conversion process.

Block 304-2 represents a transformation stage that converts the AC signals 314 from the stator to a rotating reference frame (dq0), facilitating control in a manner that is independent of the rotation of the generator. The signal passes through a multiplier block 316, which adjusts the voltage levels as per the control strategy. Proportional-Integral (PI) controllers 318 and 308 receive the signals from the multipliers 316 and 306, respectively, to provide closed-loop control of the current. These controllers are configured for maintaining the system stability and performance.

The outputs from the PI controllers 318 and 308 are then modulated by the respective multipliers 320 and 310. The purpose of the modulation is to align the control signals with the voltage and current requirements of the DFIG.

The control signals are converted from the rotating dq0 reference frame back to the stationary abc reference frame by the inverse Park transformation block 322, making them suitable for use in the three-phase power system of the DFIG. The abc reference signals are then output to block 324, which interfaces with the power electronics to control rotor currents.

The terminal voltage components $V_{qr}$ and $V_{dr}$ at block 324 are controlled by the RSC 300. A sinusoidal pulse along having modulation indices $m_{qr}$ and $m_{dr}$ is used to control voltage components. The product of $i_{qr}$ and $i_{dr}$ variables make the rotor current model non-linear To determine rotor terminal voltage, the rotor current dynamics are separated by using the following expression:

$$\sigma L_r \frac{di_{dr}}{dt} = -R_r i_{dr} + g_1; \quad (11)$$

here, $g_1$ and $g_2$ are two new control variables that depend on $m_{qr}$ and $m_{dr}$, given as:

$$m_{dr} = \frac{2}{V_{DC}}(g_1 - \omega\sigma L_r i_{qr}); \quad (12)$$

where, $V_{DC}$ represents DC-link voltage. The transfer function for the $i_{qr}$ and $i_{dr}$ currents can be obtained using equation (12), such as:

$$G_{ir}(s) = \frac{I_{dr}(s)}{G_1(s)} = \frac{I_{qr}(s)}{G_2(s)} = \frac{1}{\sigma L_r s + R_r}. \quad (13)$$

In order to control components of rotor current, each proportional integral (PI) controller 318 and 308 are designed to be implemented on the basis of zero pole cancellation. The zero of the plant transfer function is expressed as $S=-K_{Ir}/K_{pr}$, and its pole is given as $S_p=-R_r/\sigma L_r$. $K_{Ir}$ represents integral gain, and $K_{pr}$ denotes proportional gain of each PI controller. The value of the closed-loop current control time constant $T_{cr}$ is kept quite small to achieve appropriate bandwidth, and it is kept at $1/10^{th}$ of the switching frequency. On the basis of these criteria, the parameters of the PI controllers are expressed as:

$$K_{pr} = -\sigma L_r / T_{cr}; \quad (14)$$
$$K_{Ir} = R_r / T_{cr};$$

The active and reactive powers of the stator circuit are expressed as:

$$Q_s = \frac{3v_{ms}^2 L_m}{2\omega_0 L_s} - \frac{3}{2}\frac{v_{ma}^2 L_m}{L_s}i_{dr}; \quad (15)$$

$$P_s = -\frac{3L_m}{2L_s}v_{ma}i_{dr};$$

In order to avoid high rotor currents and RSC loading, the set point for $i_{dr}$ is generally set to zero.

Figure 4:
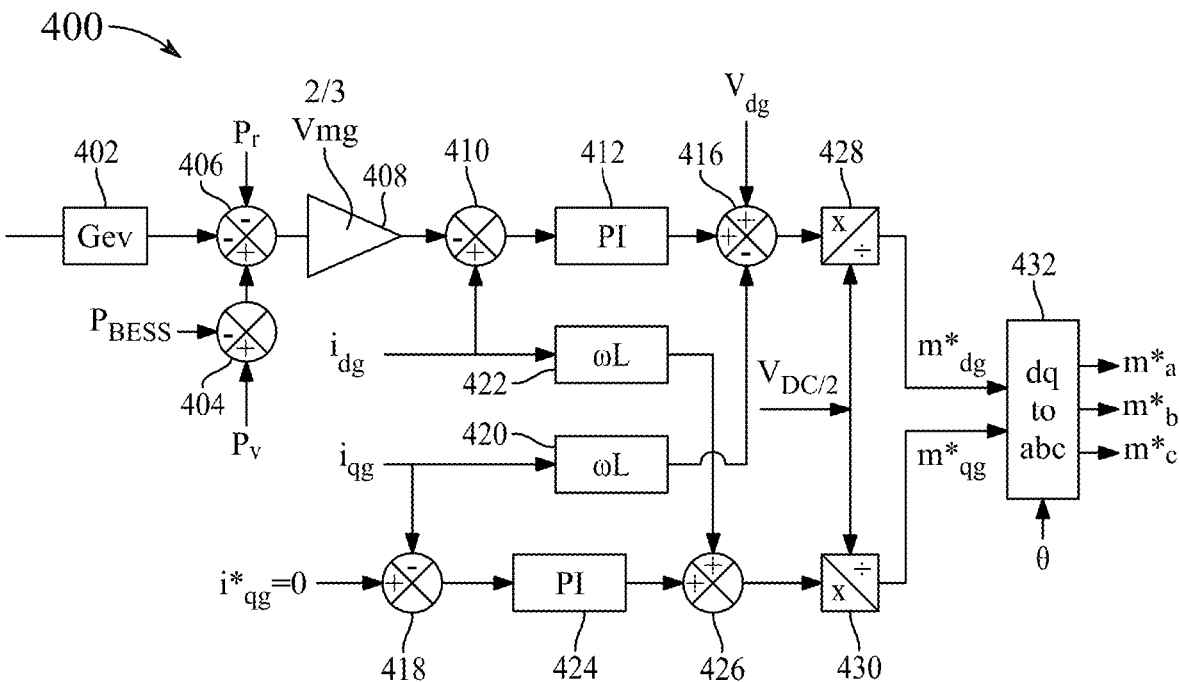
FIG. 4 depicts a control scheme for a grid side converter (GSC), according to certain embodiments.

FIG. 4 depicts a control scheme for a Grid Side Converter (GSC) 400. The GSC controller is configured to regulating the flow of power from renewable energy sources to the grid.

The GSC receives two power references at a multiplier 406, a motor power reference Pr, a rotor power reference from a multiplier 404, and $P_{BESS}$, the battery energy storage system power 404. The power references are influenced by $P_{PV}$, the photovoltaic power, also fed into the multiplier 404. A grid control voltage (GCV) component 402 provides a control signal Gev to the multiplier 406, that is used to modulate the rotor power reference.

The combined power references are then processed by an amplifier 408, which adjusts the input signals based on the operational requirements of the GSC. The amplifier 408 is connected to a multiplier 410 which receives a direct axis current from a transformation block. The transformation block converts the adjusted signals into direct axis (d-axis) and quadrature axis (q-axis) currents, $i_{dg}$ and $i_{qg}$, respectively.

The d-axis current $i_{dg}$ is passed through to a proportional-integral (PI) controller 412, which stabilizes the current by adjusting it to the desired reference value. The output of the PI controller 412 is then modulated by a multiplier 416, which aligns the voltage $V_{dg}$ with the voltage requirements of the grid.

Concurrently, the q-axis current $i_{qg}$, set to zero at a multiplier 418, which ensures that there is no reactive power flow in the direct current $i_{qg}$ loop. This current is regulated by another PI controller 424, which transmits its output to a multiplier 426, which also receives the direct current $i_{dg}$ after passage through inductive filter 422. The reactive current $i_{qg}$ is transmitted through an inductive filter 420 to multiplier 416 to maintain the quadrature axis voltage Vqg at the appropriate level.

The outputs from the multiplier 416 and 426 are fed into a park transformation block 428, which translates the d-q voltages into three-phase voltages that are synchronized with the voltage of the grid.

The voltages $V_{DC/2}$ and θ, which represent the DC link voltage and the phase angle of the grid, are inputs to this process. They are essential for ensuring that the converted power is in phase with the grid and maintaining the quality of the power delivered.

The transformed voltages at multipliers 416 and 426 are sent to an inverse park transformation block 430, which converts the d-q components back to a three-phase system, denoted by *md*, *mq*, and θ. The outputs 432, represent the modulated voltages that are ready to be applied to the grid, ensuring that the power generated by the renewable sources is efficiently and effectively integrated into the AC system of the grid.

The GSC control is described herein. The GSC control is meant to control DC-link voltage. MPPT for the PV is also maintained and tracked using PO algorithm. Firstly, current components of GSC are decoupled as:

$$L_g \frac{di_{dg}}{dt} = -R_g i_{dg} + L_g \omega_o i_{qg} - v_{dg} + \frac{v_{DC}}{2} m_{dg}; \quad (16)$$

where $V_{qg}$ and $V_{dg}$ are components of grid voltage. In this case, the d-axis of the reference frame is aligned with the stator voltage vector, thus $V_q=0$. When new variables such as $J_{dq}$ and $J_{dg}$ are introduced, the transfer function for the system is derived as:

$$G_{ig}(s) = \frac{I_{dg}(s)}{J_{dg}(s)} = \frac{I_{qg}(s)}{J_{dq}(s)} = \frac{1}{L_g s + R_{gg}}; \quad (17)$$

Modulation indices $m_{qg}$ and $m_{dg}$ are expressed as:

$$m_{dg} = \frac{2}{V_{DC}}(J_{dg} - \omega_o L_g i_{qg} + V_{dg}); \quad (18)$$

To determine the parameters of the current controller $G_{ag}$, a similar strategy is used. $K_{Ing}$ is the integral gain and $K_{pig}$ is the proportional gain, illustrated below as:

$$K_{pg} = \frac{L_g}{T_{cig}}, K_{Iig} = \frac{R_g}{T_{cig}}; \quad (19)$$

A closed loop transfer function $G_{CL}$ is used for reducing first-order function, such as:

$$G_{CL} = \frac{1}{T_{cig}S + 1}; \quad (20)$$

The power balance between the AC and DC sides of GSC is maintained by designing a voltage control loop that couples DC-link with $P_{PV}$.

$$P_{PV} = \frac{d}{dt}\frac{1}{2}C_{DC}V_{DC}^2 + P_r + \frac{3}{2}V_{dg}i_{dg} + P_{BESS}; \quad (21)$$

$i^*_{dq}$ is used as control variable instead of $i_{dq}$ when $T_{ag}$ value is kept very small. Moreover, the transfer function using new variable $P_c$ will become:

$$G_n(S) = \frac{V_{DC}^2}{P_c} = \frac{2}{C_{DC}S}; \quad (22)$$

When, $i^*_{dq}$ is quite relevant to $P_e$ and it is expressed as:

$$i_{dg} = \frac{2}{3V_{dg}}(-P_c + P_{pV} - P_r + P_{BESS}); \quad (23)$$

Equation (11) helps to determine rotor power ($P_r$) and PV power collected through measurement. The PI controller is not compatible with nonlinearities produced in to the generated signal $G_{cv}(S)$. A lead compensator along with the integrator is used for obtaining enough phase margin and removing steady state error completely. It increases the stability of the controller and adds a phase shift $\varphi_s$ at a cross gain frequency ($\omega_{cut}$). The transfer function of GSC controller at $$\left(\omega_{cut} - 0.2\frac{1}{T_{adg}}\right)$$

is expressed mathematically as:

$$G_{cv}(S) = \frac{K_{Ivg}}{s} \frac{s + \frac{r}{\alpha}}{s + r}; \quad (24)$$

where, α and r are lead compensator parameters.

Figure 5:
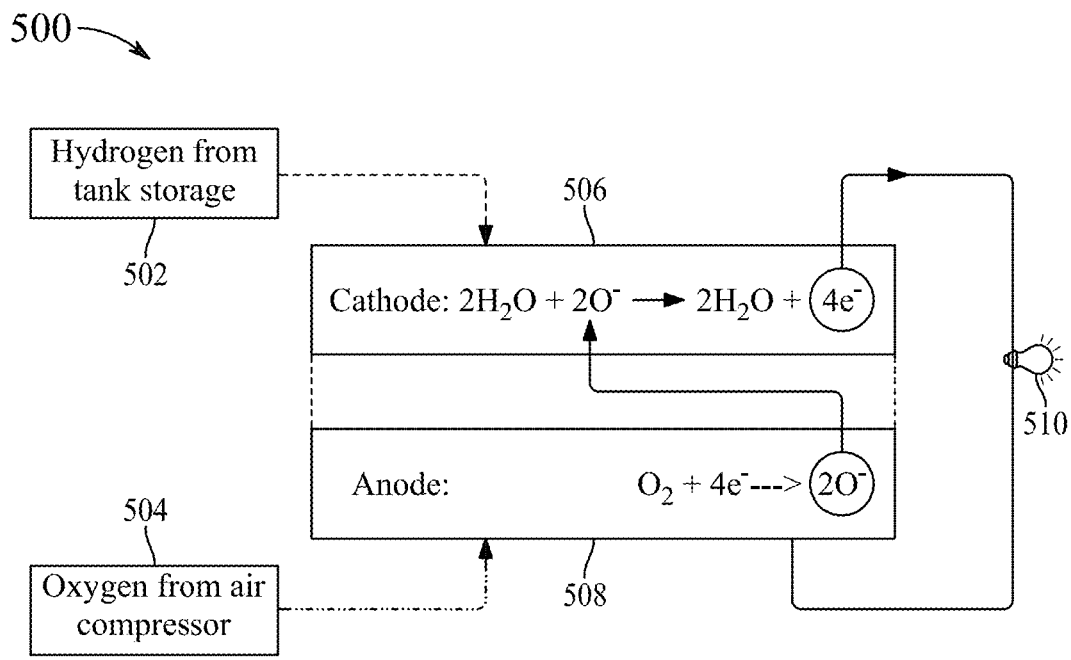
FIG. 5 illustrates a schematic diagram of a fuel cell (a solid oxide fuel cell (SOFC) type), according to certain embodiments.

FIG. 5 illustrates a schematic diagram of the fuel cell (SOFC type). Renewable energy sources have been recognized as a solution for reducing environmental pollution and lessening reliance on fossil fuels. In the context of energy produced from these sources, hydrogen is increasingly recognized as a promising energy carrier, aligning with current trends in energy transition. Among various fuel cell technologies, the solid oxide fuel cell (SOFC) stands out due to its high efficiency of approximately 70%.

The advantages of SOFCs, particularly over low-temperature fuel cells, are twofold. Firstly, SOFCs operate at elevated temperatures, facilitating the direct internal reforming of fuels such as natural gas. Secondly, the ability of SOFCs to achieve high electrical efficiencies with relative ease positions them as a preferred choice for fuel-efficient, stationary power generation. These attributes contribute to a reduction in overall system complexity, in comparison to low-temperature power plants that require an external hydrogen production unit.

Due to the operational characteristics of high-temperature fuel cells, including the challenge of rapid start-up and shut-down, SOFCs are predominantly utilized in stationary applications. Hydrogen is supplied to cathode 506, while oxygen is introduced at anode 508. At the cathode 506, reduction reactions occur, while oxidation notwithstanding, SOFCs are valued in commercial systems for their extended operational lifespan.

Moreover, the efficiency of the system is further augmented by the utilization of excess water, which can be cycled back through steam turbines to generate additional electricity. The SOFC consists of two electrodes separated by an electrolyte. Chemical reactions take place at the anode 508 which form oxygen ions. The electrolyte facilitates the movement of the oxygen ions, and the electrons displaced by the oxidation process travel from the anode 508 to the cathode 506 via an external circuit, a principle that is consistent across all fuel cell technologies. The generated electricity may be provided to a load 510.

Figure 6:
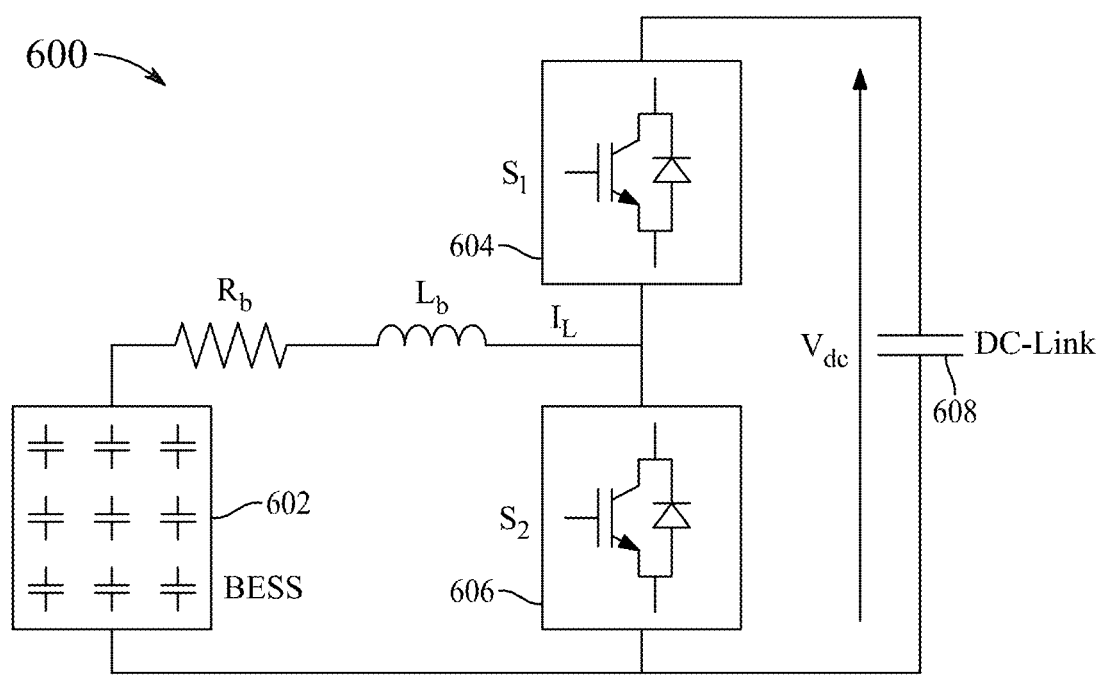
FIG. 6 is a schematic diagram of a battery energy storage system (BESS) integrated within a DC electrical power circuit, according to certain embodiments.

FIG. 6 is a schematic of a battery energy storage system (BESS) integrated within a DC electrical power circuit. The BESS 602 is implemented as a repository for electrical energy. The BESS 602 is configured to charge and discharge to store or generate power in response to system demands or energy availability. The BESS 602 is characterized by its internal resistance $R_b$ and inductance $L_b$, which are intrinsic to its operation and affect its charging and discharging profiles.

Connected to the BESS 602 are two switches, S1 604 and S2 606, which are represented as insulated gate bipolar transistors (IGBTs) with anti-parallel diodes for current flow control in both directions. S1 604 and S2 606 regulate the flow of current IL through the inductor $L_b$, managing the power exchange between the BESS 602 and the DC-link 608. S1 604 and S2 606 operate in a complementary pattern, where one is ON while the other is OFF, to either charge the BESS 602 from the DC-link 608 or discharge the BESS to support the DC-link voltage Vdc.

The DC-link 608 is implemented as the main electrical bus for the system, distributing the DC power to other components or systems connected to it. The voltage level of the DC-link 608, denoted as $V_{dc}$, is a critical parameter that needs to be maintained within certain limits for the proper functioning of the system connected to it.

In operation, the BESS 602 interacts with the DC-link 608 to either absorb excess energy from the DC-link when power supply exceeds demand or to supply energy to the DC-link when additional power is required. The efficiency and dynamics of this interaction are influenced by the properties of the BESS 602 itself ($R_b$ and $L_b$) and the operation of the switches S1 604 and S2 606.

The standard BESS model is selected and modeled as given below:

$$V_{BAT} = E - R_b \cdot I_{Bat}; \qquad (25)$$

$$E = E_0 - K \cdot \frac{Q}{Q - k \cdot \int i_1 dt} + A \cdot \exp\left(-B \cdot \int i_1 dt\right); \qquad (26)$$

$$SOC(\%) = 100\left(1 - \frac{Q_d}{C_{bat}}\right) = 100\left(1 - \frac{I_{bat}}{C_{bat}}t\right); \qquad (27)$$

where $V_{BAT}$, $I_{BAT}$, $Q_d$ and $C_{Batt}$ are BESS voltage, current, stored current hour and internal capacity respectively. The BESS SoC and electricity stored during charge are the important parameters that need to be controlled. The supervisory control system must detect the BESS SoC and take decisions according to its status and required power.

Referring back to the SOFC, a fuel cell is a reliable and promising technology for direct power generation and micro-grid applications. The fuel cell involves converting chemical energy to electrical energy with higher efficiency. The ideal open circuit cell voltage can be determined by the Nernst expression:

$$V_{Nernst} = -\frac{\Delta G}{2F} - \frac{RT}{2F}\ln\left(\frac{P_{H_2O} P_{ref}^{0.5}}{P_{H_2} P_{O_2}^{0.5}}\right); \qquad (28)$$

where, $V_{Nernst}$ denotes the Nernst voltage defined as the thermodynamic potential of the cell known as reversible voltage, $P_{ref}$ represents the standard pressure (0.1 MPa), and $\Delta G$ denotes the Gibbs free energy from the reaction. The Nernst potential is reduced when the electrical cell circuit is closed and it is given as:

$$V_{cell} = V_{Nernst} - A_{cell}\ln\left(\frac{i_{cell}}{i_o}\right) - i_{cell} \qquad (29)$$

$$R_{incell} - B_{cell}\ln\left(1 - \frac{i_{cell}}{i_L}\right);$$

where, $V_{cell}$ denotes the cell voltage in the stack. $R_{incell}$ represents an inherent fuel cell resistance, and $i_{cell}$, $i_L$ and $i_o$ denote the operating exchange current of the cell and the limiting current at which the fuel is consumed at a rate equal to its maximum supply rate, respectively. $A_{cell}$ and $B_{cell}$ denote the numerical coefficients of the cell. The ideal gas equations are used to determine the instantaneous change in partial pressures of water vapor and hydrogen in an anode gas flow channel, such as:

$$\frac{dp_{H_2}^{ch}}{dt} = \frac{RT}{V_a}\left[\frac{2M_a}{P_a^{ch}}\left(P_{H_2}^{in} - p_{H_2}^{ch}\right) - \frac{i}{2F}\right]; \qquad (30)$$

$$\frac{dP_{H_2O}}{ch} = \frac{RT}{V_a}\left[\frac{2M_a}{P_a^{ch}}\left(p_{H_2O}^{in} - P_{H_2O}^{ch}\right) - \frac{i}{2F}\right]; \qquad (31)$$

$$\frac{dp_{O_2}^{ch}}{dt} = \frac{RT}{V_a}\left[\frac{2M_a}{P_a^{ch}}\left(P_{O_2}^{in} - p_{O_2}^{ch}\right) - \frac{i}{2F}\right]; \qquad (32)$$

The CF voltage for single fuel cell can be expressed mathematically as:

$$V_{CF} = n_{CF} V_{Cell}; \qquad (33)$$

There are three main technologies that may be adopted for the electrolysis process of proton exchange, such as: a solid oxide electrolyzer (SOE), an alkaline electrolyzer and a membrane electrolyzer. The temperature operating range of SOE systems is very high, such as 550-1100° C., therefore such a high temperature does not require expensive catalysts and enhances integrating potential and conversion efficiency of the system. The input energy which is required for the SOE system can be minimized if excess heat sources for water or steam are reused due to high temperature. Water decomposition into hydrogen and oxygen is realized by current flow through the electrolyzer which is denoted by the empirical $V_{Elec}$, $I_{Elec}$ equation written as:

$$V_{Elec} = U_{rev} + \frac{r_1 + r_1 T}{A_{Elec}} I_{Elec} + k; \qquad (34)$$

$$k = k_{Elec}\ln\left[\left(k_{T_1} + \left(\frac{k_{T_2}}{T}\right) + \left(\frac{k_{T_3}}{T^2}\right)\right)\frac{I_{Elec}}{A_{Elec}} + 1\right]; \qquad (35)$$

where, $r_1$ and $r_2$ denote ohmic resistances, $k_{Elec}$, $K_{T1}$, $K_{T2}$, and $k_{T3}$ are overvoltage parameters of the electrolyzer and $A_{Elec}$ represents the area of the electrode cell.

The power management serves to maintain an adequate quality of power that is reliant on the nature of energy storage. An assessment has been conducted on all suggested energy sources to evaluate the efficacy of this power management strategy. The charging and discharging processes of the BESS 602 are contingent upon the energy requirements of the hybrid system. For this reason, the BESS 602 is connected to the DC-link through a DC-DC converter which functions as a charge controller. This controller is designed to facilitate the flow of current in both directions, so that current can flow from the BESS 602 to the DC-link and vice versa during charging and discharging cycles. The voltage output from the BESS 602 maintains a single polarity, meaning that it does not switch polarity. Additionally, the DC-DC converter is capable of operating within the first and second quadrants, a feature necessary for the roles it performs. The characteristics of the DC-DC converter are depicted in FIG. 6.

The procedure to determine the reference current command for the current control loop for BESS given by $P_{extra}$ is equivalent to the difference among the powers of PV, the GSC rating, the rotor power and the FC power:

$$P_{extra} = P_{PV} - P_{GSC} - P_r + P_{FC}; \qquad (29)$$

The amount of extra power is represented by $P_{extra}$ that is injected or absorbed by the BESS 602. The value of $P_{extra}$ is positive when wind speed and solar radiations are high therefore, the BESS 602 is meant to absorb this extra power. However, when there is low solar radiation or low wind speed, $P_{extra}$ is negative, therefore the BESS injects this negative power into the DC-link.

Figure 7:
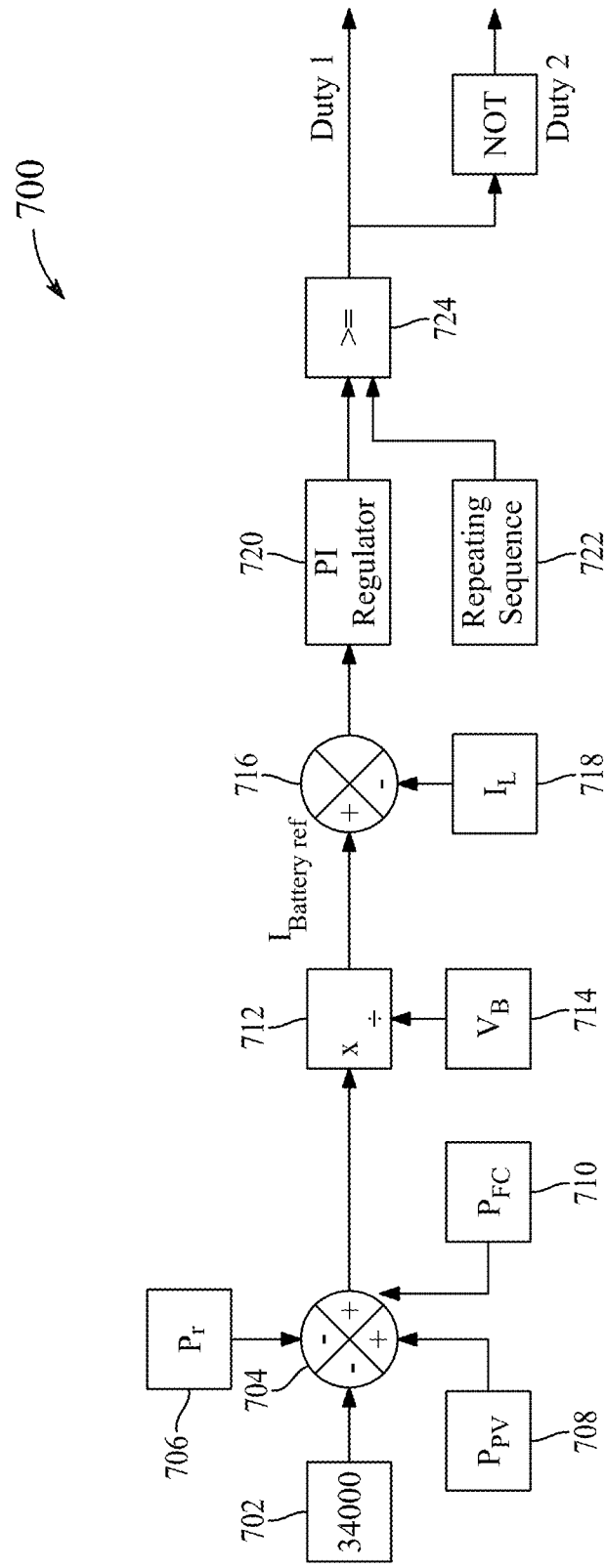
FIG. 7 is a schematic diagram for a control system associated with the BESS, according to certain embodiments.

FIG. 7 is a schematic diagram for a control system associated with the BESS 700.

A summation block 704 is configured to integrate various power inputs 702. The inputs 702 indicate a baseline or reference power level. Additionally, the power references from a photovoltaic system $P_{PV}$ 708 and a fuel cell PFC 710 are fed into the summation block 704. The output of this block is the rotor power reference $P_r$ 706, which represents the target power level for the system.

The rotor power reference $P_r$ 706 is subsequently adjusted by a multiplier 712 using the battery voltage VB 714 as a scaling factor. This product is then used to generate a reference current $I_{Batteryref}$ 716, which serves as a setpoint for charging or discharging the BESS. The reference current $I_{Batteryref}$ 716 is then processed by a proportional-integral (PI) regulator 720, which serves to maintain the current at a desired level by minimizing the difference between the reference current and the actual current $I_L$ 718 flowing into or out of the BESS.

A repeating sequence block 722 is included in the control scheme, which represents a control algorithm used to modulate the charging and discharging cycles of the BESS.

The output from the PI regulator 720 is fed into a comparator 724, which determines the duty cycle (Duty 1) for the BESS charging or discharging process. The comparator compares the PI regulator output against a threshold to generate the PWM (pulse width modulation) signal, represented as Duty 1, which controls the charge or discharge switching devices within the BESS system.

Additionally, a logical NOT gate is shown, as NOT, which inverts the Duty 1 signal to produce an opposite phase duty cycle (Duty 2). This inversion is used in control systems where complementary signals are required to operate power electronic switches in an alternating fashion.

Overall, the schematic 700 details a control approach for efficiently managing the charge and discharge operations of a BESS within an electrical system, ensuring that the storage system responds effectively to variations in power supply and demand.

FIG. 7 illustrates the control scheme for the charge controller of the BESS 700. According to FIG. 6, the following equation can be derived as:

$$L_b \frac{di_L}{dt} = V_{dc} m_b - V_b - R_b i_L;$$

where $i_L$ is the BESS current, $V_b$ is the BESS voltage, $m_b$ is the modulation index. The battery current reference has been generated by calculating the ratio of $P_{extra}$ divided by BESS voltage. An error has been determined between BESS current reference and BESS inductor current and injected into the PI controller to generate the duty cycles.

Figure 8:
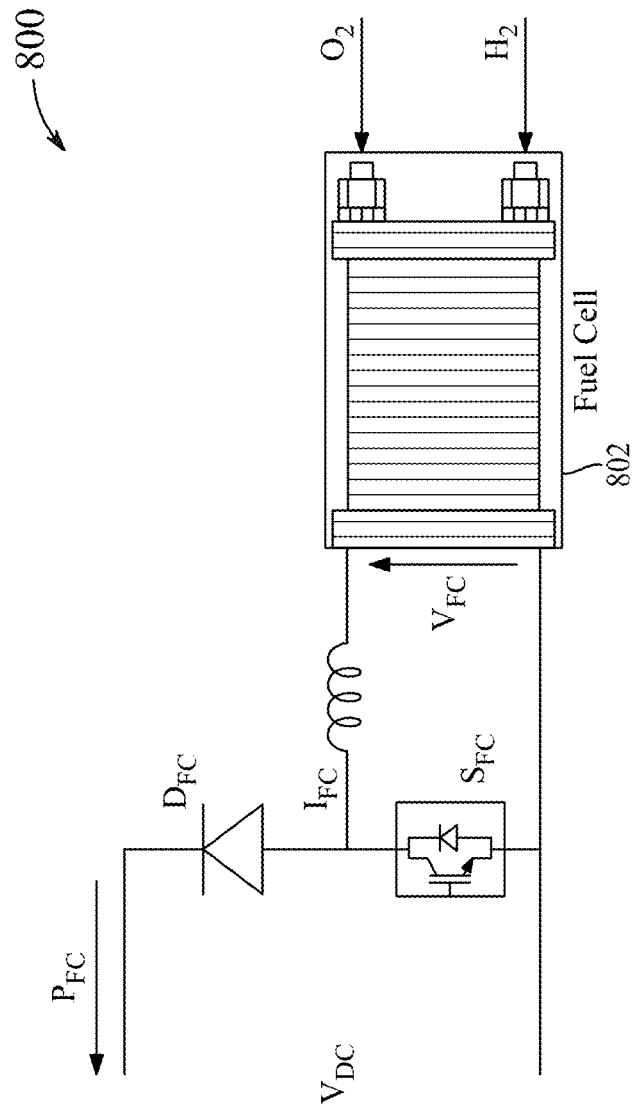
FIG. 8 illustrates a schematic of a DC-DC converter controller system associated with a fuel cell, according to certain embodiments.

FIG. 8 illustrates a schematic of a DC-DC converter controller system associated with a fuel cell. The system 800 includes a fuel cell unit 802, which receives hydrogen ($H_2$) and oxygen (O2) gases to produce electrical power. The generated power of the fuel cell is represented by $P_{FC}$. To manage the flow of electricity from the fuel cell, a diode $D_{FC}$ is placed in the circuit, ensuring that current only flows in the intended direction.

The current generated by the fuel cell, $I_{FC}$, passes through an inductor before reaching the switching element $S_{FC}$, which regulates the voltage $V_{FC}$ produced by the fuel cell. The voltage across the fuel cell $V_{FC}$ is influenced by the opening and closing actions of the switch SFC, controlled by the DC-DC converter system. The output voltage $V_{DC}$ is the controlled voltage supplied to the load or further power management systems, such as a DC link indicated here as a simplified representation.

The DC-DC boost converter 118-2 is configured to adjust the output voltage $V_{DC}$ to a desired level, ensuring compatibility with connected systems or the power grid. The DC-DC boost converter 118-2 achieves this by modulating the duty cycle of the switch $S_{FC}$, which in turn controls the rate at which energy is transferred from the fuel cell 802 to the DC link, maintaining a steady and regulated flow of power.

Figure 9:
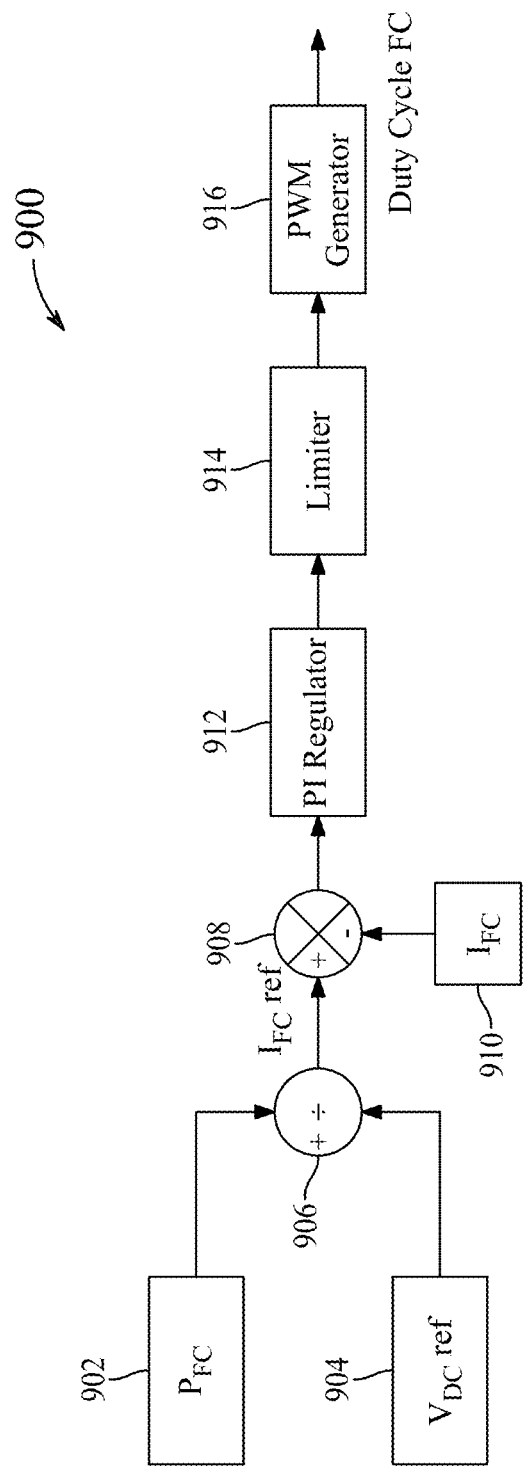
FIG. 9 illustrates a control scheme for a fuel cell (FC) system to regulate a power output, according to certain embodiments.

FIG. 9 illustrates a control system for a fuel cell (FC) system to regulate the power output. The power generated by the fuel cell is represented by PFC 902, which is then processed by a comparator 906. The comparator 906 balances the actual power output of the fuel cell against a reference power output $I_{FC}$ ref 908, which is the desired power level to be achieved by the system.

The difference between the actual and reference power outputs is fed into a proportional-integral (PI) regulator 912. The PI regulator is configured to minimize the error between the actual output and the reference value by adjusting the control signals accordingly. This regulation is critical for maintaining a stable and desired power output from the fuel cell.

To ensure that the adjustments made by the PI regulator stay within acceptable limits, a limiter 914 is implemented. The limiter 914 sets a boundary condition, preventing the control signal from exceeding specific maximum and minimum values, which could potentially harm the system or cause inefficient operation.

The output from the limiter is then directed to a pulse width modulator (PWM) 916, which converts the signal into a duty cycle for the fuel cell. The duty cycle is a measure of how long the fuel cell is active versus inactive in a given time period. Adjusting the duty cycle results in precise control over the power that the fuel cell delivers to the load or grid, ensuring that the output of the fuel cell matches the demand or operational requirements.

Figure 10:
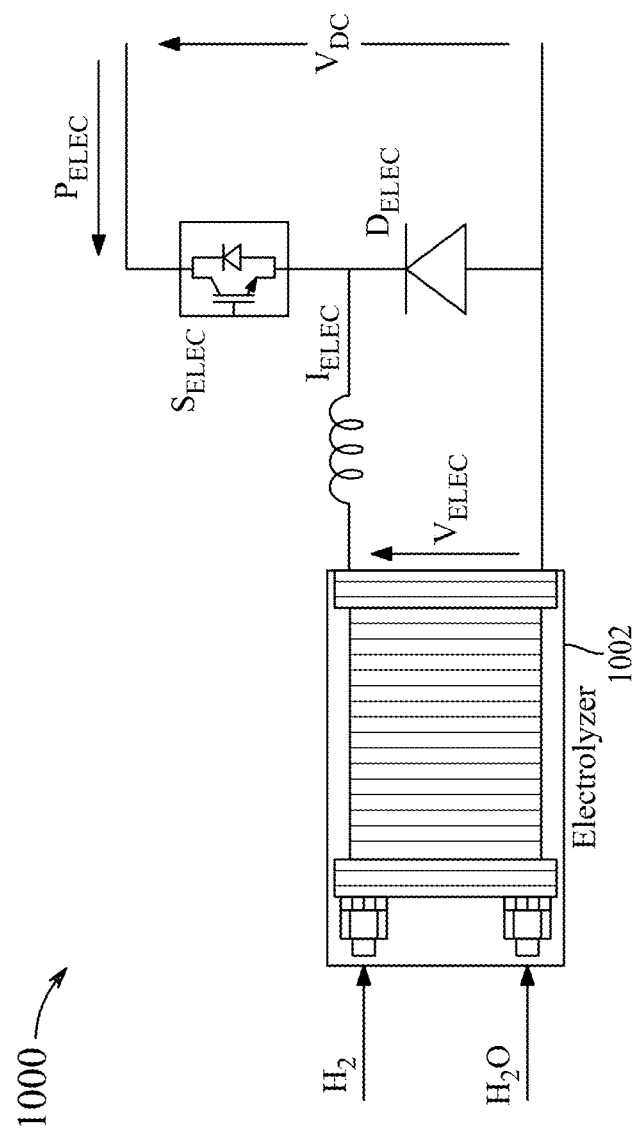
FIG. 10 depicts a schematic diagram for an electrolyzer system incorporating a buck converter, according to certain embodiments.

FIG. 10 depicts a schematic diagram for an electrolyzer system 1000 incorporating a buck converter. The electrolyzer system 1000 is designed to convert electrical energy into chemical energy through the process of electrolysis. An electrolyzer unit 1002, also referred to as an electrolyzer 1002, is configured to receive water as an input and split it into hydrogen and oxygen gases through an electrochemical reaction. The oxygen produced by the electrolyzer 1002 is a marketable product and can be stored in an oxygen tank until sold. Alternatively, the stored oxygen can be used by the fuel cell.

Electrolysis is the process of using electricity to separate water into hydrogen and oxygen. Electrolysis is performed by the electrolyzer 1002. The general function of an electrolyzer cell is to split water vapor into pure hydrogen and oxygen. This process involves steam being fed into the cathode, where it is reduced to form pure hydrogen and oxygen ions. The hydrogen gas is collected at the surface of the cathode, while the oxygen ions travel through the dense electrolyte. At the anode, the oxygen ions are oxidized to form pure oxygen gas.

An electrolyzer unit includes an electrolytic cell with two electrodes, i.e., a cathode (negative charge) and an anode (positive charge) and a membrane. Additionally, an electrolyzer system includes electrolyzer cell stacks, pumps, vents, storage tanks, a power supply, a separator, and other operational components.

Referring to FIG. 10, the circuit components of the electrolyzer system 1000 include a semiconductor switch $S_{ELEC}$, which regulates the current flow through the system, and a diode $D_{ELEC}$, which ensures current flows in the correct direction. The inductor $I_{ELEC}$, along with $S_{ELEC}$ and $D_{ELEC}$, forms the buck converter that steps down the voltage $V_{DC}$ to the operating voltage level $V_{ELEC}$ suitable for the electrolyzer. The electrical power $P_{ELEC}$ is then used to drive the electrolysis process within the electrolyzer unit 1002.

Figure 11:
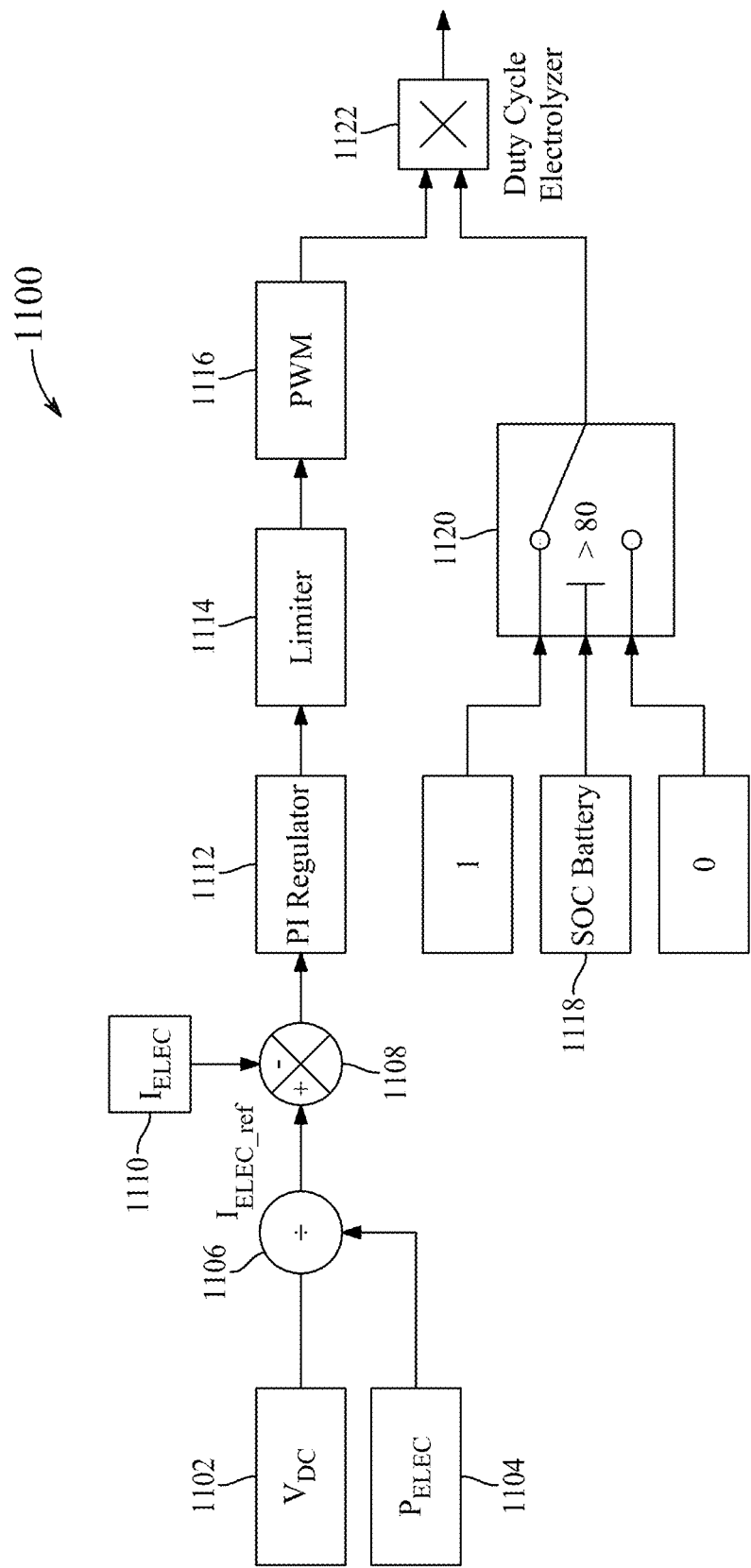
FIG. 11 depicts a control schematic for an electrolyzer within a power management system, according to certain embodiments.

FIG. 11 depicts a control schematic for an electrolyzer within a power management system, designed to regulate the duty cycle of the electrolyzer operation. The electrolyzer 1100 includes a proportional-integral (PI) regulator 1112, configured for minimizing errors and thereby ensuring the stability of the duty cycle. This is achieved by comparing the reference current ($I_{ELEC\_ref}$) 1106 against the actual current flowing into the electrolyzer ($I_{ELEC}$) 1110, with any discrepancies being adjusted by the PI Regulator 1112. To prevent the duty cycle from exceeding its operational bounds, a limiter 1114 is incorporated, constraining the output of the PI regulator to a range between 0 and 1.

A PWM Generator 1116 receives the conditioned signal from the limiter 1114 and translates it into a duty cycle for the electrolyzer (Duty Cycle Electrolyzer) 1122, which is essential for controlling energy consumption of the electrolyzer based on current state of charge (SOC) of the system. A PWM generator 1116 receives the conditioned signal from the limiter 1114 and translates the conditioned signal into a duty cycle for the electrolyzer (Duty Cycle Electrolyzer) 1122, which is used for controlling the energy consumption based on the current state of charge (SOC) of the system. The SOC Battery 1118 logic block evaluates whether the SOC is above 80%, triggering the electrolyzer to store excess power as hydrogen when necessary. This evaluation is done through a comparator 1120 that activates the electrolyzer when the SOC exceeds the 80% threshold, ensuring the efficient utilization of surplus energy and contributing to the stabilization of the overall power management system.

Figure 12:
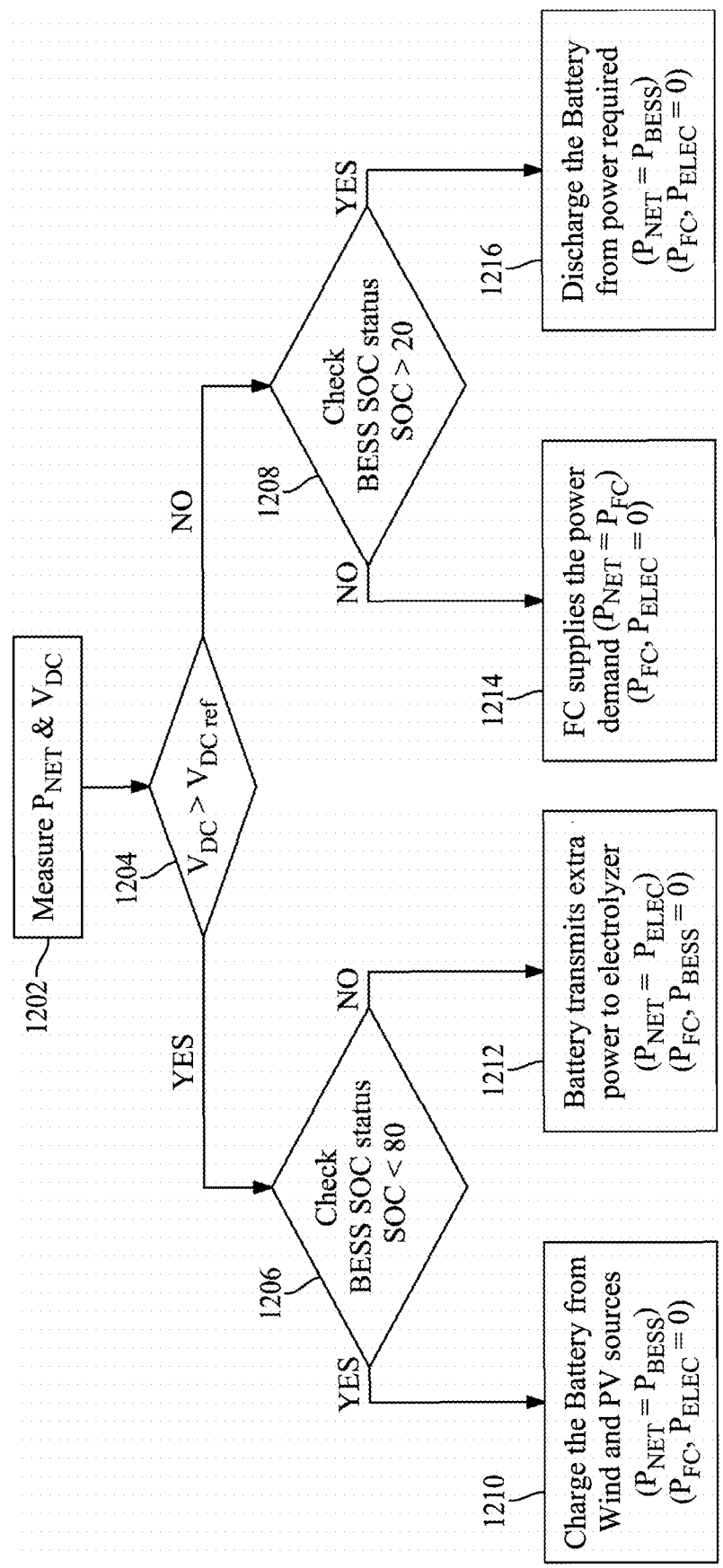
FIG. 12 presents a flowchart for managing battery power by incorporating various energy sources within a hybrid energy system, according to certain embodiments.

FIG. 12 presents a flowchart for managing the power from various energy sources within a hybrid energy system. The process begins by measuring the net power (PNET) and the DC-link voltage ($V_{DC}$), as indicated by the reference numeral 1202.

The decision block 1204 compares the DC-link voltage with a reference value. If $V_{DC}$ exceeds the reference, the process proceeds to check the state of charge (SOC) of BESS, at 1206. If the SOC is below an upper threshold, the system directs the surplus power from wind and photovoltaic sources to charge the battery, at step 1210. Conversely, if the SOC is greater than 80%, the battery supplies extra power to the electrolyzer, at step 1212.

If $V_{DC}$ is less than the reference voltage, the process assesses the SOC of the BESS again, at step 1208. If the SOC is greater than a lower threshold, the fuel cell (FC) maintains power according to the demand, at step 1214. If the SOC is less than or equal to the lower threshold the BESS discharges to meet the power requirements, at step 1216. In a non-limiting example, the upper threshold is 80% and the lower threshold is 20%. However, the upper threshold of the SOC can be selected from the range comprising about 50% to about 90%. Further, the lower threshold of the SOC can be selected from the range comprising 0% to about less than 50%.

FIG. 1-FIG. 12 illustrated various aspects of the present disclosure where a fuel cell (FC) and an electrolyzer have been integrated with a wind turbine generator comprising a doubly fed induction generator (WTG-DFIG), a photovoltaic (PV) array, and a battery energy storage system (BESS) in a hybrid grid system. The HGCS was implemented and power management for the system was conducted using the Simulink environment in MATLAB. The entire system underwent simulation under various environmental conditions and variable loads to assess its impact and contribution to energy efficiency and quality. The DFIG capacity was set at 2 MW, while the PV system capacity exceeded the Grid-Side Converter (GSC) rating. GSC and rotor-side converter (RSC) ratings are expected to be between 24% to 31% of the generator rating. Accordingly, GSC and RSC ratings were selected as 340 kVA and 250 kVA, respectively. The PV system rating was set at 1.1 MW. To safeguard the GSC against overloads, a 100-Ah BESS was incorporated into the system. Additionally, an FC with a capacity of 50 kW and voltage of 625 V. along with an electrolyzer with a voltage of 35 V. were added. The parameters of the DFIG. WTG. and GSC are provided in Table 1.

TABLE 1

DFIG, Wind turbine and GSC parameters

| Symbol | Parameter | Values |
|---|---|---|
| f | Frequency (Hz) | 50 |
| $P_s$ | Rated Stator power (W) | 2e6 |
| n | Rated Rotational Speed (rpm) | 1500 |
| $I_s$ | Rated Stator current (A) | 1760 |
| $V_s$ | Rated Stator voltage (V) | 690 |
| $T_{em}$ | Rated Torque (N · m) | 12732 |
| p | Pole pair | 2 |
| u | Stator/rotor turn ratio | 1/3 |
| $V_r$ | Rotor rated voltage (non-reached) (V) | 2070 |
| $S_{max}$ | Maximum Slip | 1/3 |
| $C_b$ | Rated Rotor voltage reference to stator | $V_r * S_{max} * u$ |
| $R_s$ | Stator leakage | 2.6e-3 |
| $L_{si}$ | Leakage Inductance (stator and rotor) (H) | 0.087e-3 |

TABLE 1-continued

DFIG, Wind turbine and GSC parameters

| Symbol | Parameter | Values |
|---|---|---|
| $L_m$ | Magnetization Inductance (H) | 2.5e-3 |
| $R_r$ | Rotor resistancereferred to stator (Ωq) | 2.6e-3 |
| — | Stator Inductance (H) | $L_s = L_m + L_{si}$ |
| — | Rotor Inductance (H) | $L_r = L_m + L_{si}$ |
| $V_{dc}$ | DC link voltage | 1050-1150 |
| J | Inertia | 127 |
| $f_{sw}$ | Switching Frequency | 4e3 |
| N | Gearbox ratio | 100 |
| ρ | Air Density | 1.225 |
| β | Pitch angle | 0 |
| — | $C_{pmax}$ | 0.44 |
| $C_{bus}$ | DC bus capacitance | 80e$^{-3}$ |
| $R_g$ | Grid side filter resistance | 20e$^{-6}$ |
| $L_g$ | Grid side filter inductance | 400e$^{-6}$ |

FIG. 13-FIG. 29 illustrate results of the performance of the HGCS of the present disclosure implemented in Simulink environment.

Figure 13:
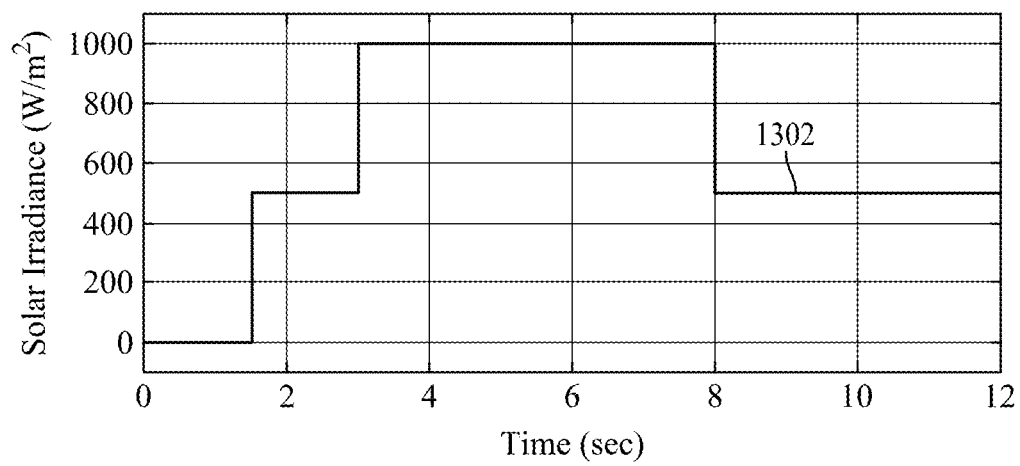
FIG. 13 illustrates a variation of solar irradiance over time, according to certain embodiments.

FIG. 13 illustrates the variation of solar irradiance over time, measured in watts per square meter (W/m²). Curve 1302 represents a time series where initially, for the first 2 seconds, the solar irradiance was zero, indicating no solar energy is being received. At 2 seconds, there was a steep increase to 500 W/m², which is maintained until the 3-second mark. From 3 to 8 seconds, the irradiance doubled to 1000 W/m², depicting peak solar conditions. Afterward, it dropped back to 500 W/m² and remained constant for the remainder of the observation time.

Figure 14:
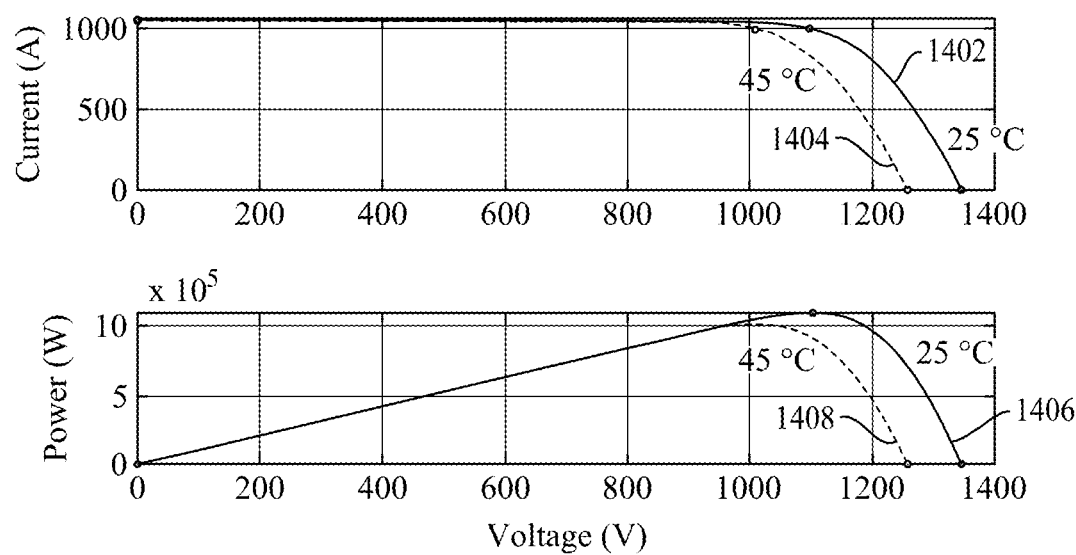
FIG. 14 shows characteristics of current (I) and power (P) output of a photovoltaic (PV) array under maximum power point tracking (MPPT) conditions, according to certain embodiments.

FIG. 14 shows the characteristics of current (I) versus voltage (V) and power (P) output versus voltage (V) of a PV array under the MPPT conditions. The array type specified is an Advance Power API-M305 available from Advance Solar, Landover, Maryland, composed of 30 series modules with 120 parallel strings. The curves demonstrate how current and power vary with voltage (V) at different temperatures. At lower temperatures, indicated by curve 1404 for current and curve 1406 for power, both current and power output are higher for a given voltage level compared to higher temperatures, indicated by curve 1402 for current and curve 1408 for power, illustrating the temperature dependence of PV array performance.

Table 2 lists design parameters for the PV, BESS, FC and electrolyzer.

TABLE 2

PV, BESS, FC and Electrolyzer design parameters

| Parameter | Values |
|---|---|
| PV parallel strings | 60 |
| Series connected modules per strings | 30 |
| Maximum power PV array (W) | 213.15 |
| Open circuit voltage $V_{OC}$(V) | 36.3 |
| Short circuit current $I_{SC}$ | 7.84 |
| BESS nominal voltage (V) | 800 |
| BESS rated capacity (Ah) | 100 |
| Initial SoC BESS | 50 |
| FC Power (kW) | 50 |
| FC Voltage | 625 |
| Nominal hydrogen utilization | 99.56 |

Figure 15:
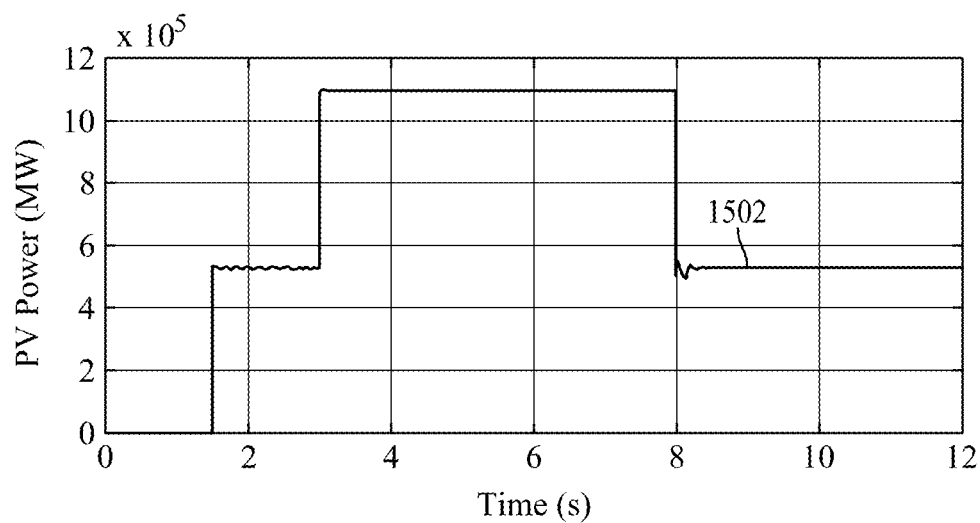
FIG. 15 illustrates a PV power generation over time, according to certain embodiments.

In FIG. 15, curve 1502 indicates the photovoltaic (PV) power generation over time. The power output shows a stepwise increase. Initially, there was no power generation until 2 seconds, after which the PV power output rose to a lower plateau. At 3 seconds, there was a significant jump to the maximum power output, reaching 1.1 Megawatts, which corresponds to the maximum power point (MPP) operation of the PV system. This high level of power generation was sustained until the 8-second mark. Subsequently, there was a decrease in power as solar irradiance dropped, representing a transition to lower power generation for the remainder of the time observed.

Figure 16:
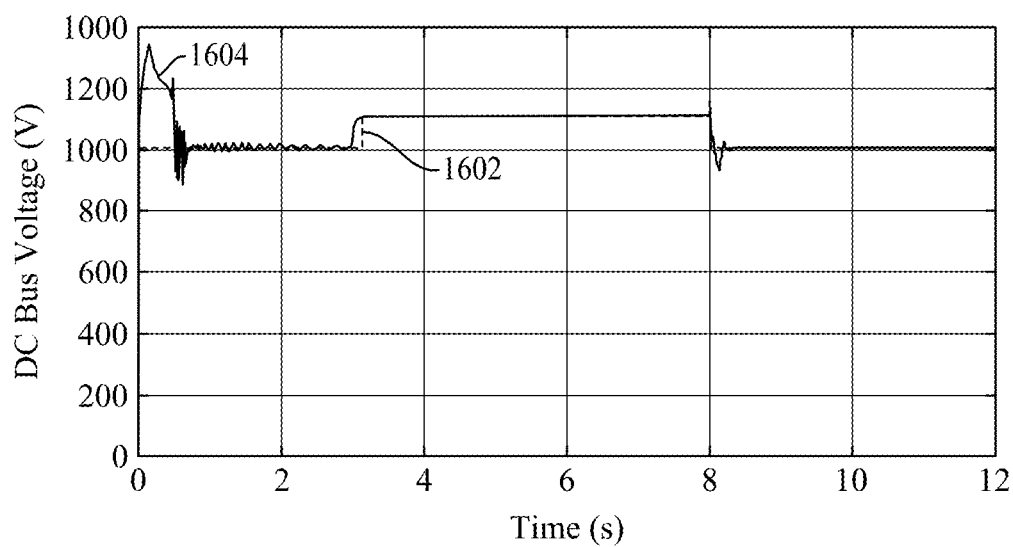
FIG. 16 depicts a DC bus voltage profile over the time period of FIG. 15, according to certain embodiments.

FIG. 16 depicts the DC bus voltage profile over the same time period. Curve 1602 indicates the reference voltage, and Curve 1604 indicates the DC bus voltage corresponding to the present disclosure. Initially, there were some fluctuations, which quickly stabilized as the BESS began to supply power. The DC bus voltage remained stable at 1000 Volts until the 3-second mark, where it rose to the reference level of 1158 Volts, due to the additional power being injected from the PV system. The elevated voltage was maintained during the period of high PV power generation from 3 to 8 seconds. After 8 seconds, as the PV power generation decreased, the voltage adjusted accordingly but remained around the reference level.

Figure 17:
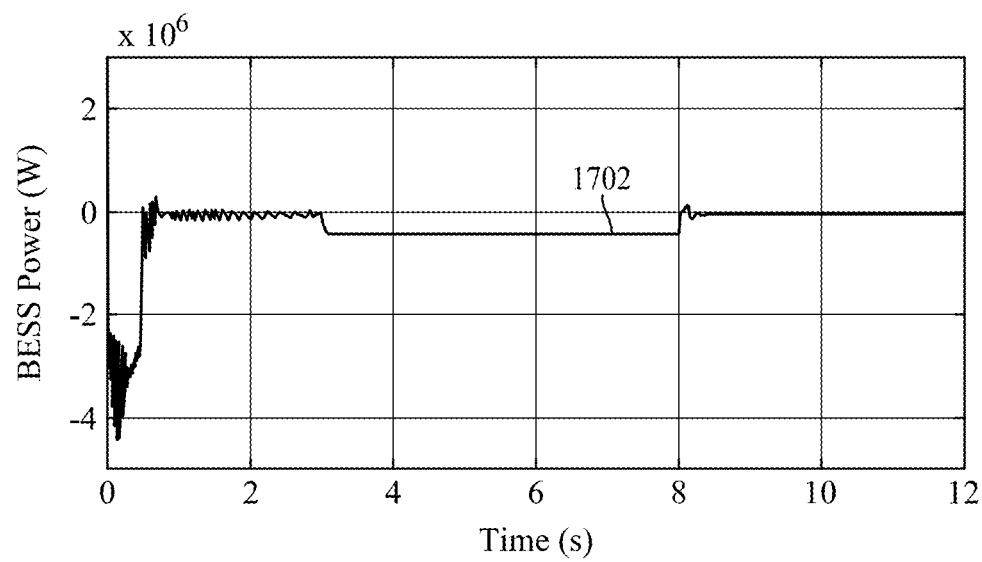
FIG. 17 illustrates a power profile of the BESS over time, according to certain embodiments.

FIG. 17 illustrates a power profile of the BESS over time. In this graph, the y-axis represents the power in megawatts (MW) while the x-axis denotes time in seconds(s).

The behavior of the BESS during charging and discharging was depicted when there was surplus power available at the DC link. The graph illustrates that the BESS was fully discharged between 1 to 2 seconds and after 8 seconds. During this time, negative power indicated that the BESS was charging when the photovoltaic (PV) generation operated at its maximum power point (MPP) between 3 to 8 seconds. The BESS state of charge (SoC) was restricted between 20% and 80%. At an SoC of 80%, the BESS discharged power to the DC link until its SoC dropped to 20%. Initially, the BESS was charged during the transient phase of the system. Subsequently, the BESS began discharging to support the power at the DC link until 3 seconds, after which it started charging again when sufficient power from the PV source met the demand at the DC link. When the BESS reached an SoC of 80% and surplus power remained at the DC link, the Electrolyzer began converting power to produce and store hydrogen in the hydrogen tank. When the BESS SoC decreased to 20%, the fuel cell was connected to ensure system stability and continuity of service. The FC utilized the stored hydrogen from the tank to generate power for supply to the DC link.

Figure 18:
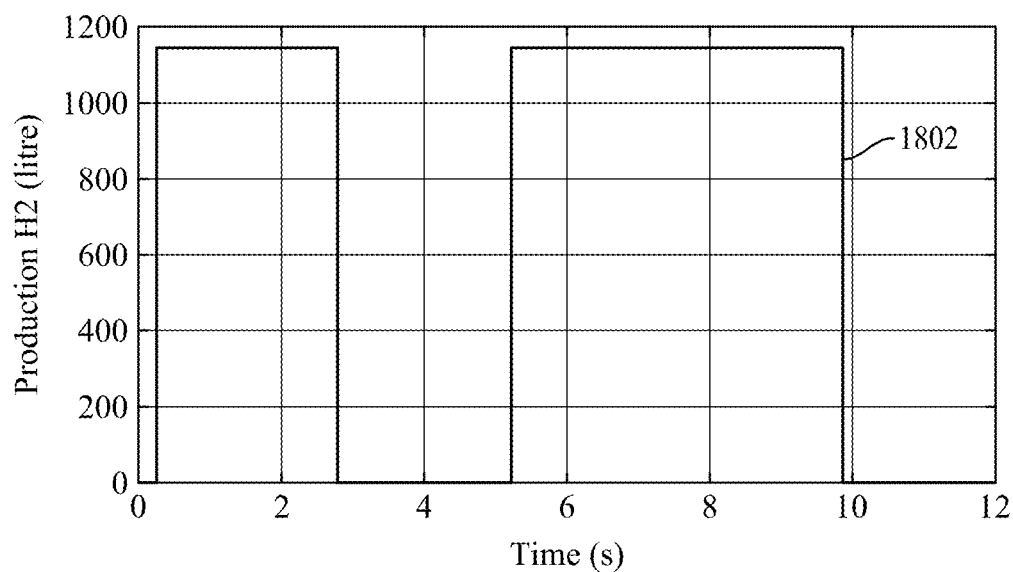
FIG. 18 displays tracking of a production of hydrogen ($H_2$) in litres over time, according to certain embodiments.

FIG. 18 displays tracking of the production of hydrogen (H2) in liters over time, represented in seconds. The vertical axis measures the volume of hydrogen produced, while the horizontal axis represents the time over which the production takes place. Curve 1802 indicates the production of $H_2$.

Figure 19:
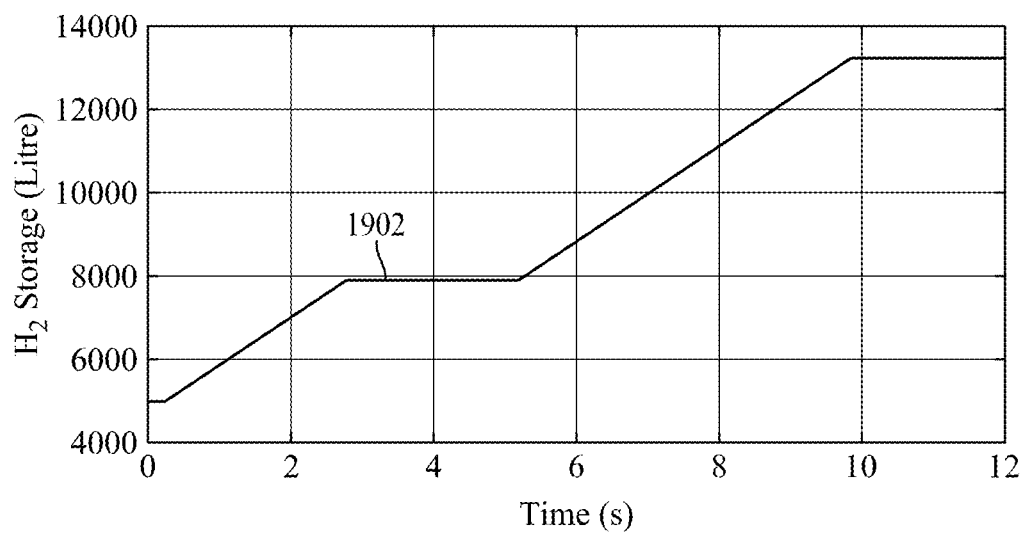
FIG. 19 illustrates a quantity of hydrogen stored over time during a charging phase of the BESS, according to certain embodiments.

FIG. 19 illustrates the quantity of hydrogen stored over time during the charging phase of the BESS. Curve 1902 indicates a steady increase in hydrogen storage in the hydrogen tank during the charging phase of BESS.

Figure 20:
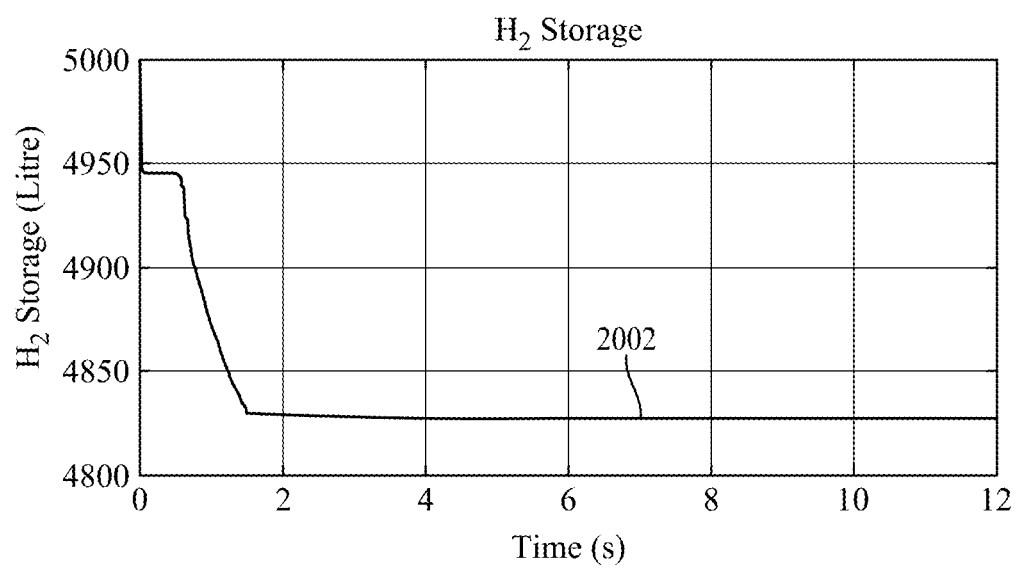
FIG. 20 illustrates hydrogen storage levels over time, according to certain embodiments.

FIG. 20 illustrates the hydrogen storage levels over time, during the usage phase by the fuel cell during the discharging period of the BESS when its State of Charge (SoC) drops to 20%. Curve 2002 shows a sharp decrease in hydrogen storage at the beginning, suggesting that the fuel cell was consuming hydrogen to generate electricity. After the initial drop, the hydrogen storage levels off, indicating that the rate of hydrogen consumption by the fuel cell has stabilized. This stabilization likely corresponds to the fuel cell operating at a steady state to meet the power demands as the BESS SoC remains low.

Figure 21:
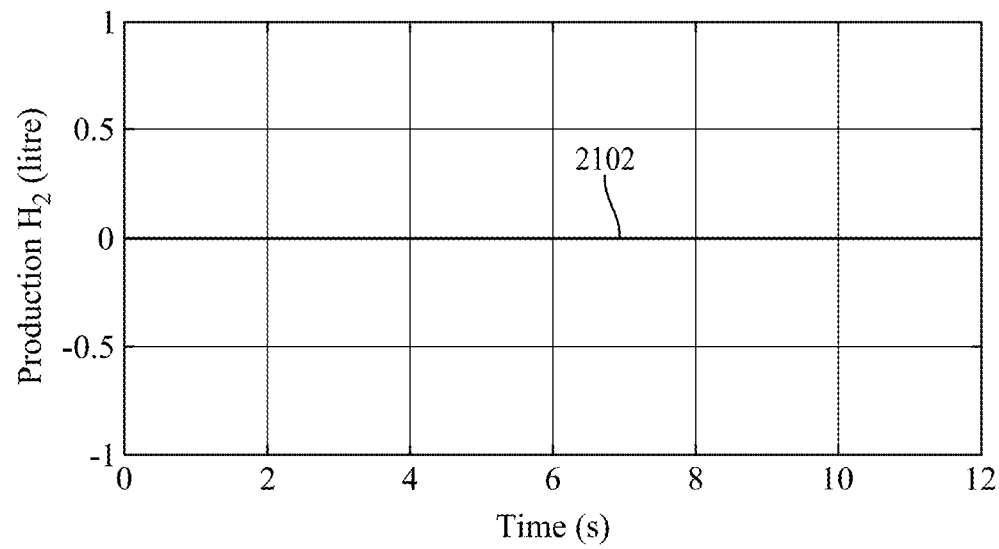
FIG. 21 illustrates $H_2$ production (litre) in charging state of BESS, according to certain embodiments.

FIG. 21 illustrates H2 production (in liters) in the charging state of BESS. Curve 2102 indicates the production of hydrogen by the electrolyzer during the charging phase of the BESS. Curve 2102 depicts an increase in hydrogen production over time, indicating that the electrolyzer was actively generating hydrogen as the BESS charges. As the BESS is charged and the electrolyzer produces hydrogen, the hydrogen level of the storage tank is steadily increased.

Figure 22:
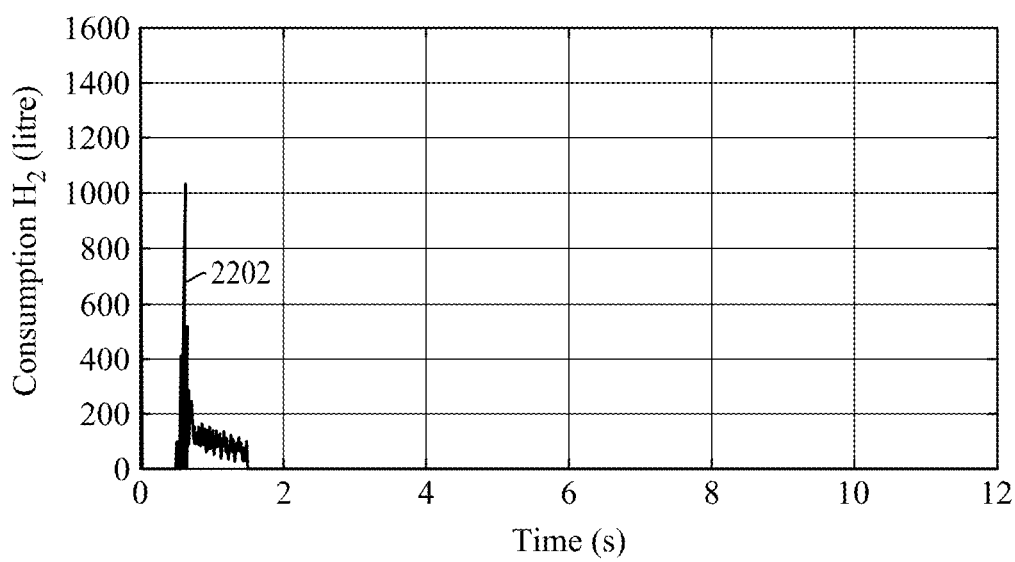
FIG. 22 illustrates a hydrogen consumption ($H_2$) over time during a charging case, according to certain embodiments.

FIG. 22 illustrates the hydrogen consumption ($H_2$) over time during a charging phase. The y-axis represents hydrogen consumption in litres per second, and the x-axis represents time in seconds. Curve 2202 indicates a sharp peak at the beginning, where the consumption increased rapidly to a value above 1500 litres per second and then quickly decreased. After the initial peak, there were fluctuations, but the consumption levelled off to near zero as time progressed.

Figure 23:
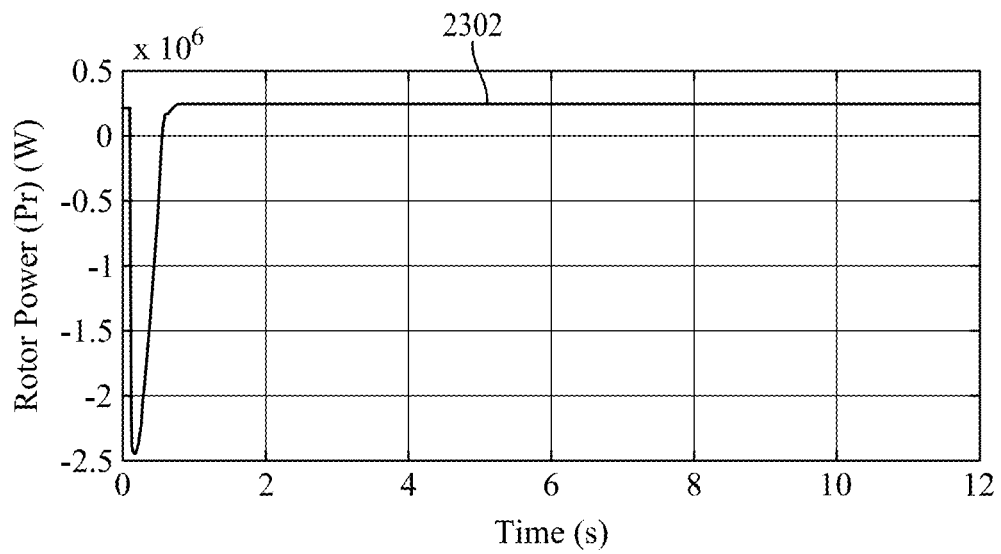
FIG. 23 shows an active power of a rotor over time, according to certain embodiments.

FIG. 23 shows the active power of the rotor over time. The y-axis is scaled by $10^6$ Watts, indicating that the power levels are in the megawatt range. Curve 2302 begins with a negative power spike, dropping down to approximately $-2.5 \times 10^6$ W (or −2.5 MW), which then rapidly ascends to a positive value, stabilizing slightly above zero.

Figure 24:
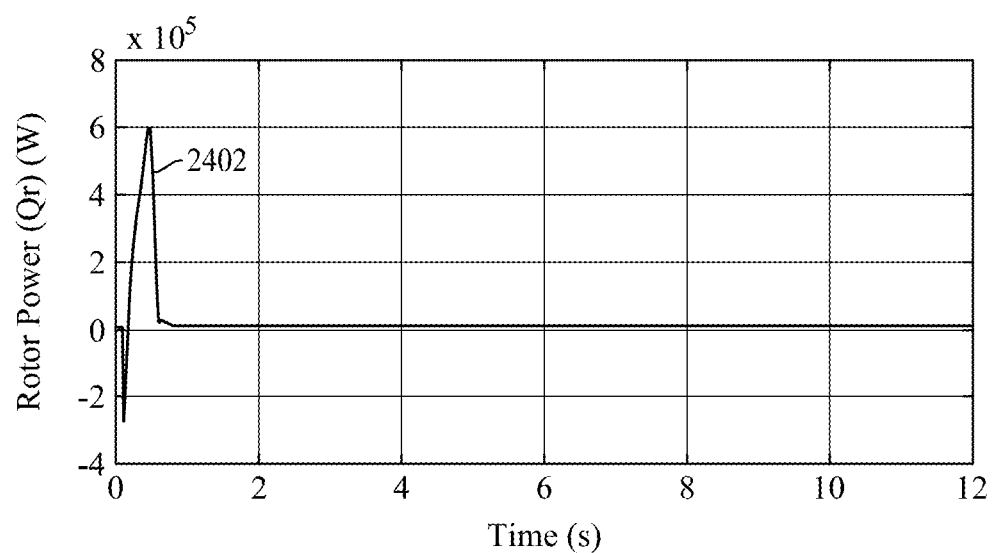
FIG. 24 shows the reactive power of the rotor over time, according to certain embodiments.

FIG. 24 shows the reactive power of the rotor over time. Curve 2402 indicates Rotor (Qr) Power (W) plotted over time.

Figure 25:
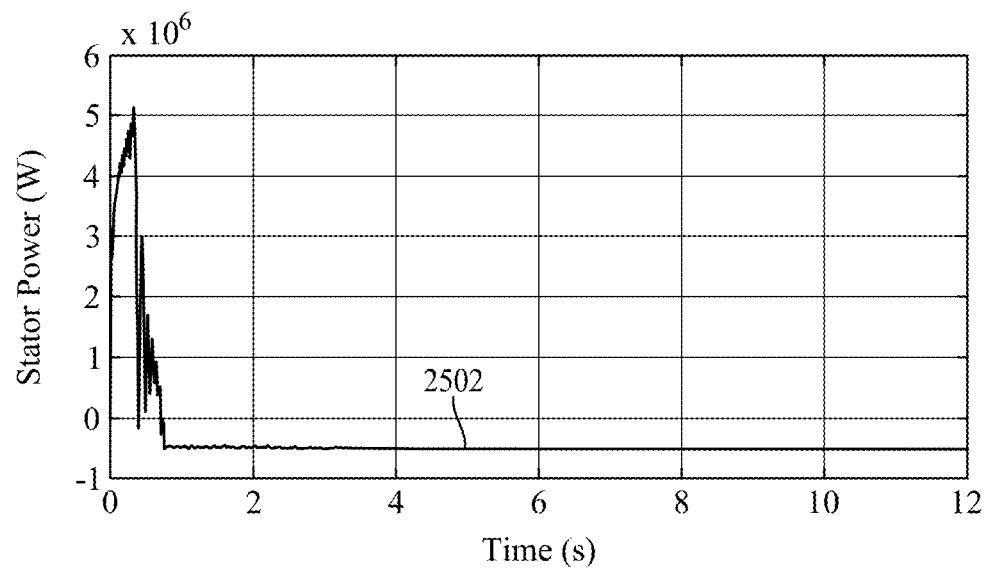
FIG. 25 displays the active power of the stator over time in a power generation system, according to certain embodiments.

FIG. 25 displays the active power of the stator over time in a power generation system. Curve 2502 shows a large positive spike at the beginning, reaching just over $5 \times 10^6$ W (5 MW), which quickly decreased and stabilized close to zero.

Figure 26:
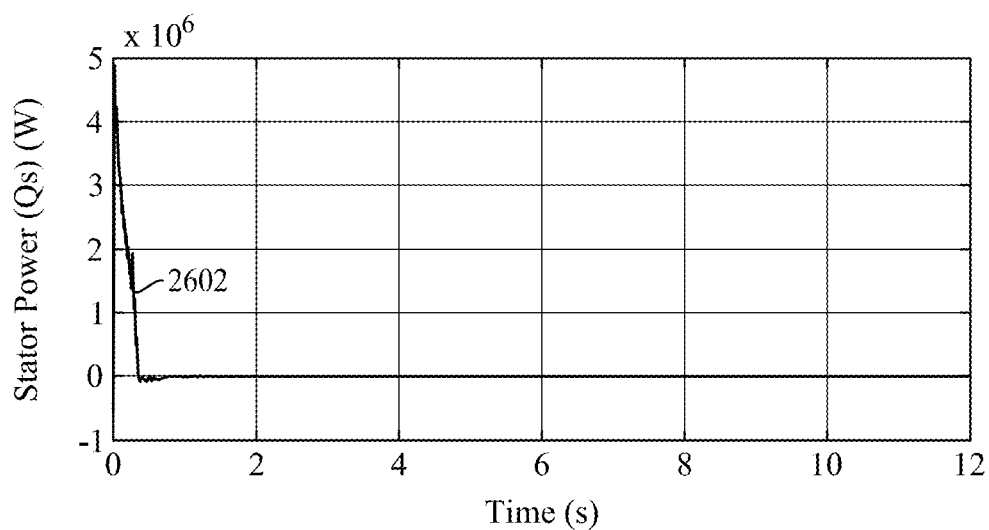
FIG. 26 depicts the reactive power of the stator over time, according to certain embodiments.

FIG. 26 depicts the reactive power of the stator over time. Curve 2602 starts with a spike, which quickly diminished to a value around zero, indicating negligible reactive power.

Figure 27:
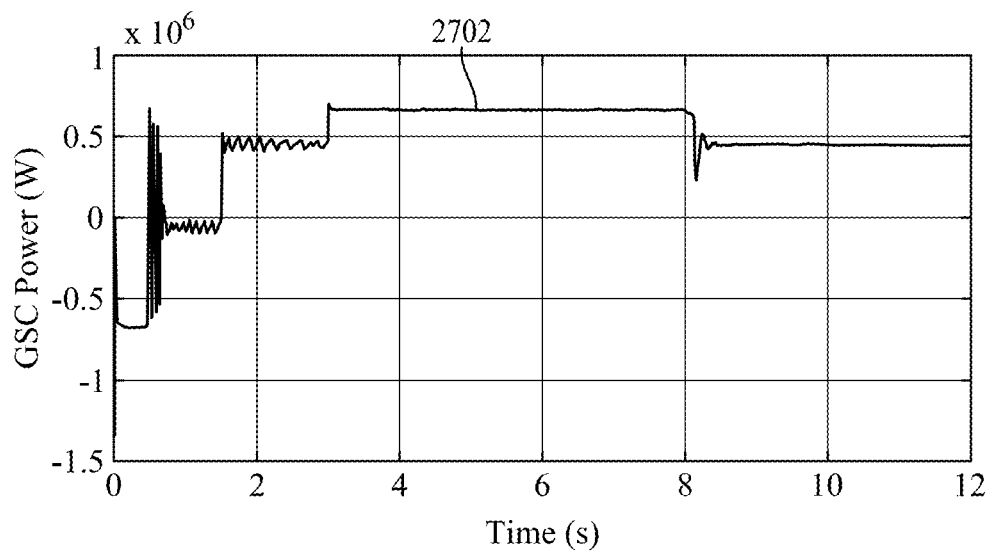
FIG. 27 illustrates the power waveform for the GSC, according to certain embodiments.

FIG. 27 illustrates the power waveform for the GSC. Curve 2702 exhibits fluctuations in power, with values both above and below zero, suggesting bidirectional power flow.

Figure 28:
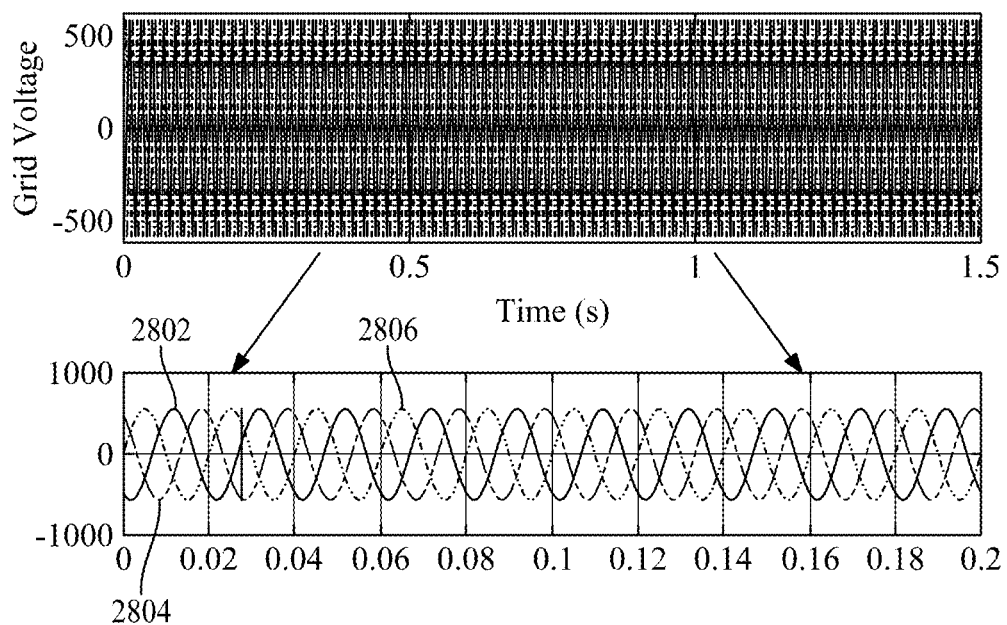
FIG. 28 shows a representation of grid voltage over time, according to certain embodiments.

FIG. 28 shows a representation of grid voltage over time. The upper part of the figure represents voltage magnitude over a longer period, and the bottom part is a zoomed-in view of the AC grid voltage, showing a stable waveform with multiple phases represented by curves 2802, 2804, and 2806. The curves 2802, 2804, and 2806 demonstrate the stability of the grid voltage, which is the main objective of the system.

Figure 29:
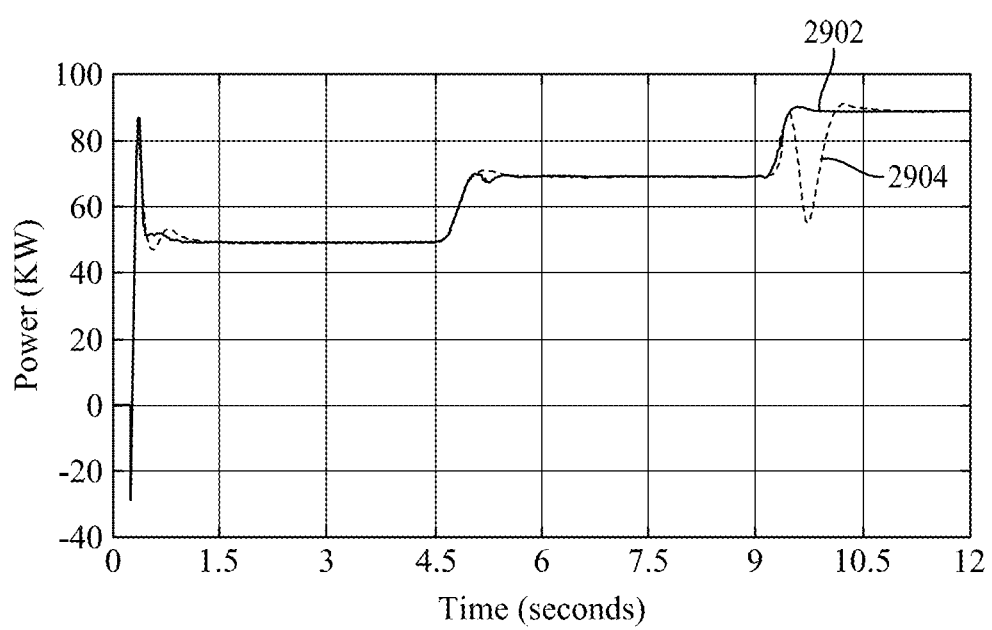
FIG. 29 shows the output power response of the HGCS of the present disclosure and the conventional system, according to certain embodiments.

FIG. 29 shows the output power response of the HGCS of the present disclosure and the output power response of a conventional system. Curve 2902 shows the output of HGCS of the present disclosure. Curve 2904 shows the output of the conventional system. It is evident from the graph that the output of the HGCS rendered stable and reliable output during fluctuating energy demands as compared to the conventional system.

The present disclosure as described in FIG. 1-FIG. 29, in accordance with one embodiment, describes a hybrid grid connected system (HGCS) for managing power transmission to a power grid from a plurality of power generation sources. The HGCS includes a plurality of electrical generation sources including a primary source comprising a solar photovoltaic cell (PV) system and a wind power generation system, a secondary source comprising a battery energy storage system ("BESS") and a tertiary source comprising a fuel cell system operatively connected to an electrolyzer system, a DC-link connected to a power electronic converter of the HGCS, wherein the HGCS is connected to the power grid, wherein each of the plurality of electrical generations sources is connected to the DC-link, wherein the power electronic converter is configured to transmit power generated from the plurality of electrical generation sources to the power grid, wherein the DC-link is located between a rotor side converter (RSC) and a grid side converter (GSC), a voltmeter configured to measure the voltage between the positive rail and the negative rail of the DC-link, a power meter connected to the DC-link, wherein the power meter is configured to measure a net power in the DC-lin, a controller connected to the power electronic converter, wherein the controller includes electrical circuitry, a memory storing program instructions and at least one processor configured to execute the program instructions to: maximize transmission of power to the power grid from the primary power to the power grid from the fuel cell system when the voltage of the BESS is less than a reference voltage of the DC-link, and use the power generated by at least one of the PV system and the wind power generation system for powering one of the BESS and the electrolyzer system based on the voltage of the DC-link being greater the reference voltage of the DC-link.

In one aspect, the controller is configured to receive the power generated by the PV system at the DC-link, receive the voltage of the DC-link, receive the net power of the DC-link, calculate a sum of the powers of the PV system, the BESS, the wind power generation system and the fuel cell system, compare the voltage of the DC-link to the reference voltage of the DC-link, when the voltage at the DC-link is greater than less than a reference voltage of the DC-link, transmit the power generated by the PV system to the power grid via the GSC.

In one aspect, the controller is further configured to use at least a portion of the net power to recharge the BESS based on a state of charge of the BESS being below a first threshold and transmit a remaining portion of the net power to power the electrolyzer system when the state of charge of the BESS is equal to or exceeds the first threshold.

In one aspect, the controller is further configured to supply the net power to the power grid from the BESS based on a state of charge of the BESS being within a specified range, and supply the net power to the power grid from the fuel cell system based on the state of charge of the BESS being outside of the specified range.

In one aspect, the controller is further configured to supply the net power to the power grid from the BESS based on a state of charge of the BESS is in the specified range of greater than or equal to 20% and less than or equal to 80%, supply the net power to the power grid from the fuel cell system based on the state of charge of the BESS is less than 20%, and supply the net power to the electrolyzer based on the state of charge of the BESS being greater than 80%.

In one aspect, the controller is configured to power the electrolyzer system by the remaining portion of the net power to generate hydrogen and store the hydrogen in a hydrogen tank.

In one aspect, the HGCS system further includes an anode of the fuel cell connected to receive oxygen from an air compressor, a cathode of the fuel cell connected to receive hydrogen from the hydrogen tank, where electricity generated by the fuel cell is supplied to the GSC and delivered to the power grid when the voltage of the DC-link is less than the reference voltage of the DC-link and the state of charge of the BESS is less than 20%.

In one aspect, the HGCS system further includes a positive output terminal of the BESS connected to a first inductor, where the first inductor is connected to a positive input terminal of a DC/DC buck boost converter, a negative output terminal of the BESS connected to a negative input terminal of the DC/DC buck boost converter, a positive output terminal of the DC/DC buck boost converter connected to the positive rail of the DC-link, a negative output terminal of the DC/DC buck boost converter connected to the negative rail of the DC-link, a positive input terminal of a DC-DC buck converter connected to the positive rail of the DC-link, a negative input terminal of the DC-DC buck converter connected to the negative rail of the DC-link, a positive output terminal of the DC-DC buck converter connected to a second inductor, an anode of the electrolyzer connected to the second inductor, a negative output terminal of the DC-DC buck converter connected to a cathode of the electrolyzer, where the electrolyzer is configured to generate hydrogen and oxygen gases when the state of charge of the BESS is greater than 80%, and a hydrogen tank configured to store the hydrogen generated by the electrolyzer.

In one aspect, the HGCS system further includes at least one wind turbine of the wind power generation system connected to an input terminal of a doubly fed induction generator (DFIG), a first output terminal of the DFIG connected directly to the power grid, a second output terminal of the DFIG connected to the RSC, where the RSC is connected to the DC-link based on one of the SOC of the BESS being less than the first threshold and a set of reactive components at the DC-link being less than or greater than a reactive reference threshold.

In one aspect, the electrolyzer is selected from a group including a solid oxide electrolyzer, an alkaline electrolyzer, and a membrane electrolyze, and the fuel cell system includes a solid oxide fuel cell.

In another embodiment of the present disclosure, a method of managing power transmission to a power grid from a hybrid grid connected system (HGCS) is described. The HGCS includes a plurality of electrical generation sources including a primary source comprising a solar photovoltaic cell (PV) system and a wind power generation system, a secondary source comprising a battery energy storage system (BESS) and a tertiary source comprising a fuel cell system operatively connected to an electrolyzer system, wherein each electrical generation source is connected to a DC-link of a power electronic converter connected to the power grid, wherein the power electronic converter is configured to transmit power generated by the plurality of electrical generation sources of the HGCS to the power grid, wherein the DC-link is connected between a rotor side converter (RSC) and a grid side converter (GSC), the method comprising:

receiving the power generated from the PV system at the DC-link and transmitting the power to the power grid via the GSC, measuring, with a voltage meter, a voltage of the DC-link, receiving, by the controller, the voltage of the DC-link, measuring, with a power meter, a net power in the DC-link, receiving, by the controller, the net power in the DC-link, calculating, by the controller, a sum of the powers of the PV system, the wind power generation system, the BESS and the fuel cell system, determining, by the controller, when the voltage at the DC-link is less than a reference voltage of the DC-link, supplying the net power to the power grid from the fuel cell system when the voltage of the BESS is less than a reference voltage of the DC-link, and using the power generated by at least one of the PV system and the wind power generation system for powering one of the BESS and the electrolyzer system based on the voltage of the DC-link being greater the reference voltage of the DC-link.

In one aspect, the method step of supplying the net power to power at least one of the BESS and the electrolyzer system includes using at least a portion of the net power to recharge the BESS based on a state of charge of the BESS being below a first threshold, and transmitting a remaining portion of the net power to power the electrolyzer system when the state of charge of the BESS is equal to or exceeds the first threshold.

In one aspect, the method step of supplying the net power to the power grid includes supplying the net power to the power grid from the BESS based on a state of charge of the BESS being within a specified range and supplying the net power to the power grid from the fuel cell system based on the state of charge of the BESS being outside of the specified range.

In one aspect, the method further includes supplying the net power to the power grid from the BESS based on a state of charge of the BESS being in the specified range of greater than or equal to 20% and less than or equal to 80%, supplying the net power to the power grid from the fuel cell system based on the state of charge of the BESS being less than 20%; and supplying the net power to the electrolyzer based on the state of charge of the BESS being greater than 80%.

In one aspect, the method step of supplying the net power to the electrolyzer system includes using the remaining portion of the net power by the electrolyzer system to generate hydrogen and storing the hydrogen in a hydrogen tank for supplying to the fuel cell system.

In one aspect, the method further includes connecting an anode of the fuel cell to receive oxygen from an air compressor, connecting a cathode of the fuel cell to receive hydrogen from the hydrogen tank, generating electricity by the fuel cell, and supplying the electricity generated by the fuel cell to the GSC for delivering to the power grid when the voltage of the DC-link is less than the reference voltage of the DC-link and the state of charge of the BESS is outside of the specified range.

In one aspect, the method further includes connecting a positive output terminal of the BESS to a first inductor and connecting the first inductor to a positive input terminal of a DC/DC buck boost converter, connecting a negative output terminal of the BESS to a negative input terminal of the DC/DC buck boost converter, connecting a positive output terminal of the DC/DC buck boost converter to a positive rail of the DC-link, connecting a negative output terminal of the DC/DC buck boost converter to a negative rail of the DC-link, connecting a positive input terminal of a DC-DC buck converter to the positive rail of the DC-link, connecting a negative input terminal of the DC-DC buck converter to the negative rail of the DC-link, connecting a positive output terminal of the DC-DC buck converter to a second inductor and connecting the second inductor to an anode of the electrolyzer, connecting a negative output terminal of the DC-DC buck converter to a cathode of the electrolyzer, generating, by the electrolyzer, hydrogen and oxygen gases when the state of charge of the BESS is greater than 80%, and storing the hydrogen in the hydrogen tank.

In one aspect, the method further includes connecting at least one wind turbine of the wind power generation system to an input terminal of a doubly fed induction generator (DFIG), connecting a first output terminal of the DFIG directly to the power grid, connecting a second output terminal of the DFIG to the RSC, and connecting the RSC to the DC-link based on one of the SOC of the BESS being less than the first threshold and a set of reactive components at the DC-link being less than or greater than a reactive reference threshold.

In another embodiment of the present disclosure, a method for connecting a plurality of electrical generation sources to a power grid is described. The method includes connecting a solar photovoltaic cell (PV) system and a wind power generation system to a DC-link of the power grid as primary sources, connecting a BESS to the DC-link as a secondary source, connecting a fuel cell system to the DC-link as a tertiary source, where the fuel cell system includes an electrolyzer system configured for generating hydrogen gas as a feed gas for the fuel cell system, and maximizing, by a power electronic converter, transmission of power to the power grid from the primary sources relative to the secondary source and the tertiary source based on a state of charge (SoC) of the BESS.

In one aspect, the method includes measuring, with a voltmeter, a voltage of the DC-link, measuring, with a power meter, a net power in the DC-link, supplying, by the power converter, the power generated by the primary sources to the power grid when the voltage at the DC-link is less than a reference voltage of the DC-link, when the power generated by the primary sources is less than a reference net power, supplying, by the power converter, power stored in the BESS to the DC-link, when the SoC of the BESS is less than a first reference SoC, supplying the power generated by the fuel cell system to the DC-link, and when the SoC of the BESS is greater than a second reference SoC, supplying a remaining power of the BESS to the electrolyzer system to generate hydrogen gas and storing the hydrogen gas in a hydrogen tank.

Figure 30:
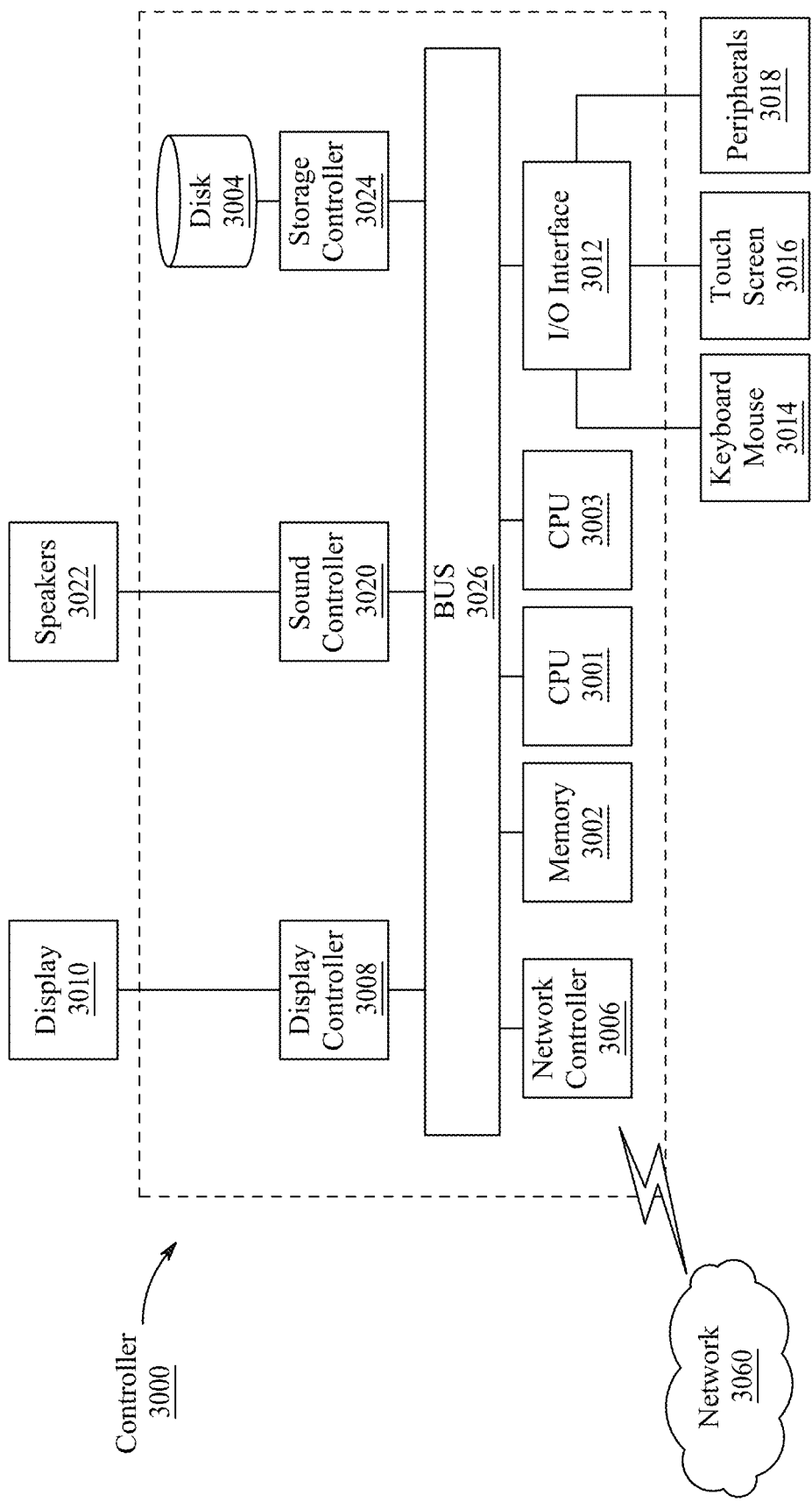
FIG. 30 is an illustration of a non-limiting example of details of computing hardware used in the computing system, according to certain embodiments.

Next, further details of the hardware description of the computing environment according to exemplary embodiments is described with reference to FIG. 30. In FIG. 30, a controller 3000 is described is representative of the controller 132 of FIG. 1 in which the controller is a computing device which includes a CPU 3001 which performs the processes described above/below. The process data and instructions may be stored in memory 3002. These processes and instructions may also be stored on a storage medium disk 3004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 3001, 3003 and an operating system such as Microsoft Windows 30, Microsoft Windows 31, Microsoft Windows 32, UNIX, Solaris, LINUX, Apple MAC-OS and other systems known to those skilled in the art.

The hardware elements in order to achieve the computing device may be realized by various circuitry elements, known to those skilled in the art. For example, CPU 3001 or CPU 3003 may be a Xenon or Core processor from Intel of America or an Opteron processor from AMD of America, or may be other processor types that would be recognized by one of ordinary skill in the art. Alternatively, the CPU 3001, 3003 may be implemented on an FPGA, ASIC, PLD or using discrete logic circuits, as one of ordinary skill in the art would recognize. Further, CPU 3001, 3003 may be implemented as multiple processors cooperatively working in parallel to perform the instructions of the inventive processes described above.

The computing device in FIG. 30 also includes a network controller 3006, such as an Intel Ethernet PRO network interface card from Intel Corporation of America, for interfacing with network 3060. As can be appreciated, the network 3060 can be a public network, such as the Internet, or a private network such as an LAN or WAN network, or any combination thereof and can also include PSTN or ISDN sub-networks. The network 3060 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 3008, such as a NVIDIA GeForce GTX or Quadro graphics adaptor from NVIDIA Corporation of America for interfacing with display 3010, such as a Hewlett Packard HPL2445w LCD monitor. A general purpose I/O interface 3012 interfaces with a keyboard and/or mouse 3014 as well as a touch screen panel 3016 on or separate from display 3010. General purpose I/O interface also connects to a variety of peripherals 3018 including printers and scanners, such as an OfficeJet or DeskJet from Hewlett Packard.

A sound controller 3020 is also provided in the computing device such as Sound Blaster X-Fi Titanium from Creative, to interface with speakers/microphone 3022 thereby providing sounds and/or music.

The general purpose storage controller 3024 connects the storage medium disk 3004 with communication bus 3026, which may be an ISA, EISA, VESA, PCI, or similar, for interconnecting all of the components of the computing device. A description of the general features and functionality of the display 3010, keyboard and/or mouse 3014, as well as the display controller 3008, storage controller 3024, network controller 3006, sound controller 3020, and general purpose I/O interface 3012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 31.

Figure 31:
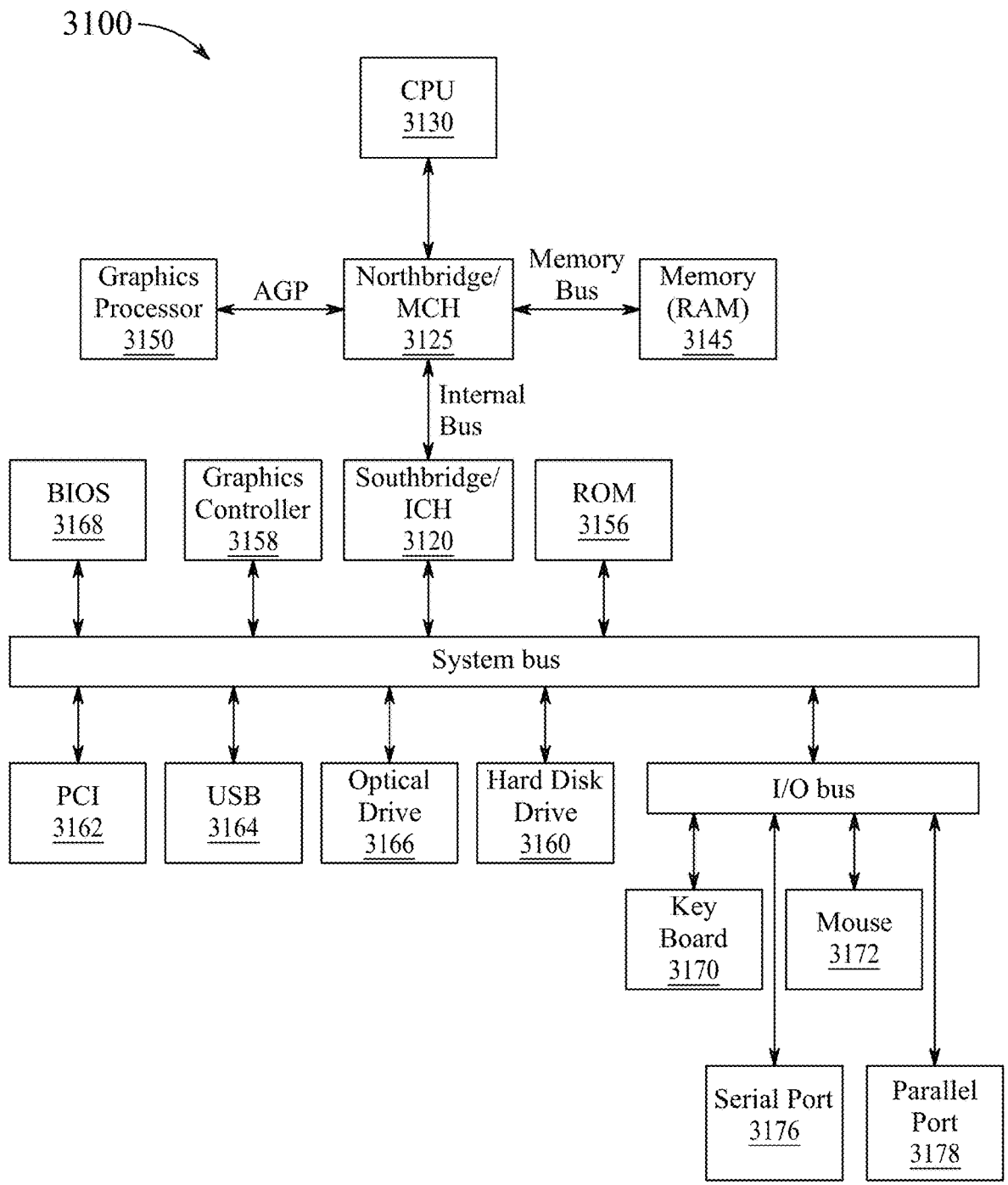
FIG. 31 is an exemplary schematic diagram of a data processing system used within the computing system, according to certain embodiments.

FIG. 31 shows a schematic diagram of a data processing system 3100, according to certain aspects of the present disclosure, for performing the functions of the exemplary aspects. The data processing system 3100 is an example of a computer in which code or instructions implementing the processes of the illustrative aspects may be located.

In FIG. 31, data processing system 3100 employs a hub architecture including a north bridge and memory controller hub (NB/MCH) 3125 and a south bridge and input/output (I/O) controller hub (SB/ICH) 3120. The central processing unit (CPU) 3130 is connected to NB/MCH 3125. The NB/MCH 3125 also connects to the memory 3145 via a memory bus, and connects to the graphics processor 3150 via an accelerated graphics port (AGP). The NB/MCH 3125 also connects to the SB/ICH 3120 via an internal bus (e.g., a unified media interface or a direct media interface). The CPU Processing unit 3130 may contain one or more processors and even may be implemented using one or more heterogeneous processor systems.

Figure 32:
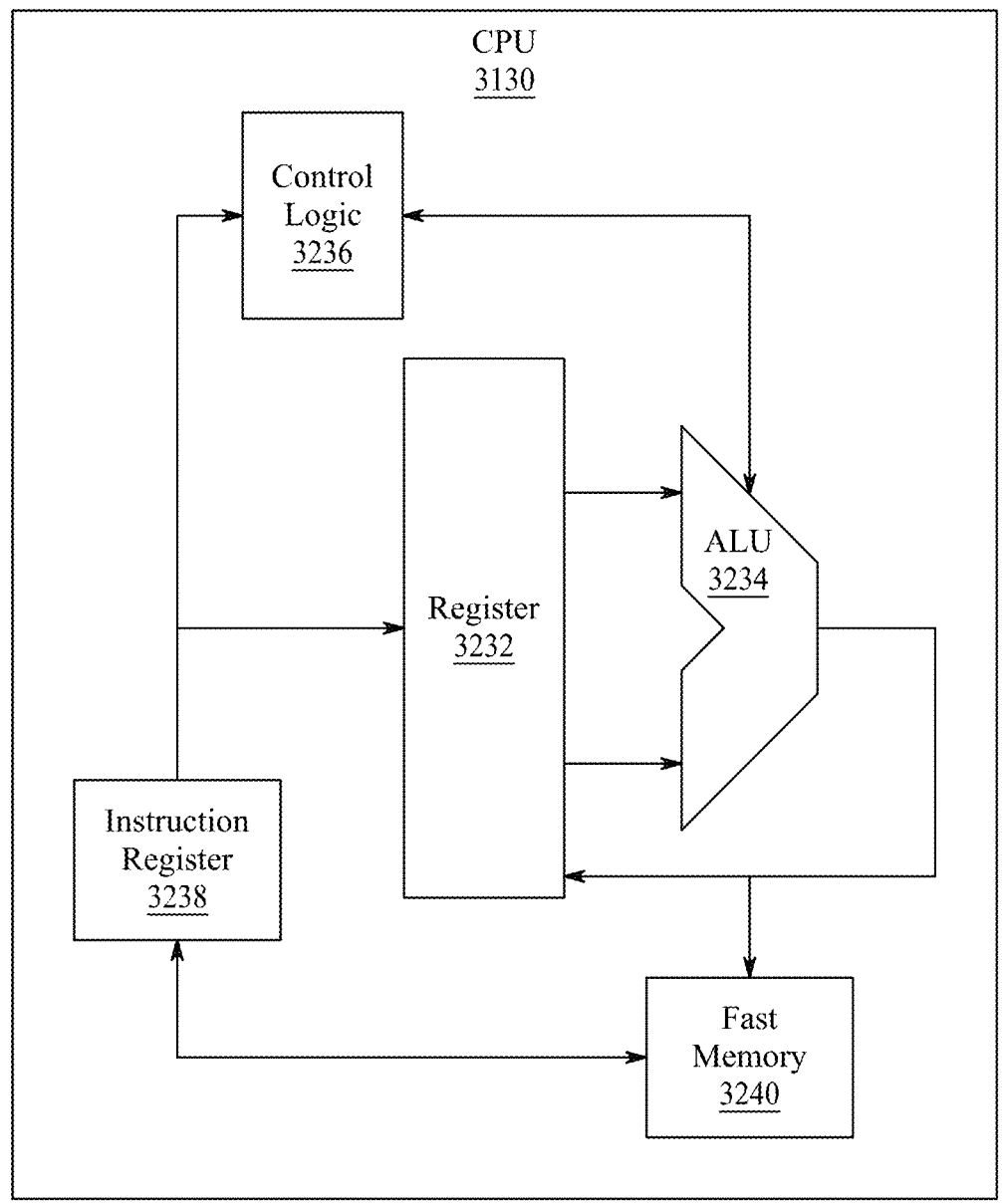
FIG. 32 is an exemplary schematic diagram of a processor used with the computing system, according to certain embodiments.

For example, FIG. 32 shows one implementation of CPU 3130, according to an aspect of the present disclosure. In one implementation, the instruction register 3238 retrieves instructions from the fast memory 3240. At least part of these instructions are fetched from the instruction register 3238 by the control logic 3236 and interpreted according to the instruction set architecture of the CPU 3130. Part of the instructions can also be directed to the register 3232. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 3234 that loads values from the register 3232 and performs logical and mathematical operations on the loaded values according to the instructions. The results from these operations can be feedback into the register and/or stored in the fast memory 3240. According to certain implementations, the instruction set architecture of the CPU 3130 can use a reduced instruction set architecture, a complex instruction set architecture, a vector processor architecture, a very large instruction word architecture. Furthermore, the CPU 3130 can be based on the Von Neuman model or the Harvard model. The CPU 3130 can be a digital signal processor, an FPGA, an ASIC, a PLA, a PLD, or a CPLD. Further, the CPU 3130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 31, the data processing system 3100 can include that the SB/ICH 3120 is coupled through a system bus to an I/O Bus, a read only memory (ROM) 3156, universal serial bus (USB) port 3164, a flash binary input/output system (BIOS) 3168, and a graphics controller 3158. PCI/PCIe devices can also be coupled to SB/ICH 888 through a PCI bus 3162.

The PCI devices may include, for example, Ethernet adapters, add-in cards, and PC cards for notebook computers. The Hard disk drive 3160 and CD-ROM 3166 can use, for example, an integrated drive electronics (IDE) or serial advanced technology attachment (SATA) interface. In one implementation the I/O bus can include a super I/O (SIO) device.

Further, the hard disk drive (HDD) 3160 and optical drive 3166 can also be coupled to the SB/ICH 3120 through a system bus. In one implementation, a keyboard 3170, a mouse 3172, a parallel port 3178, and a serial port 3176 can be connected to the system bus through the I/O bus. Other peripherals and devices that can be connected to the SB/ICH 3120 using a mass storage controller such as SATA or PATA, an Ethernet port, an ISA bus, a LPC bridge, SMBus, a DMA controller, and an Audio Codec.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 33:
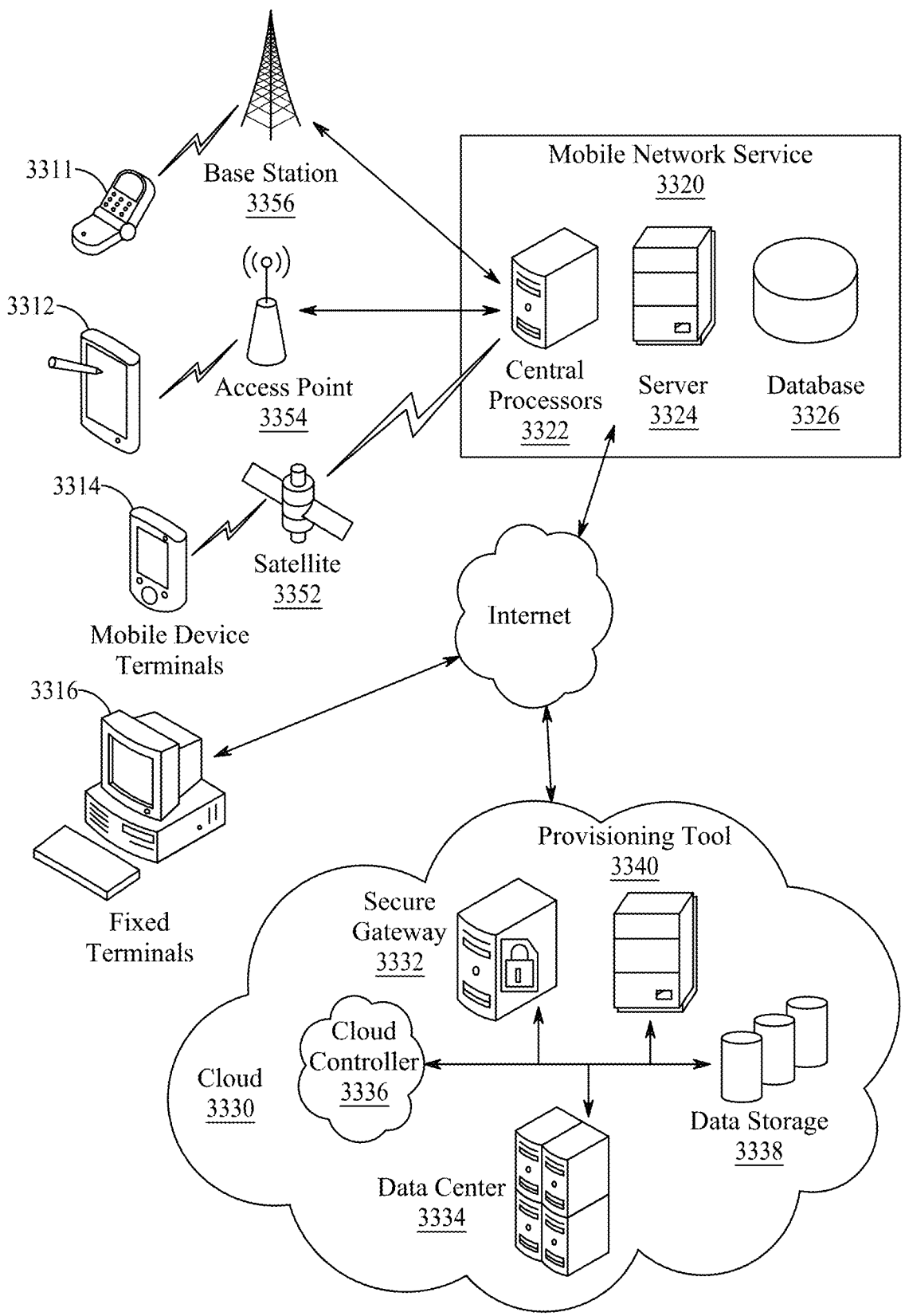
FIG. 33 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing as shown in FIG. 33, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A hybrid grid connected system (HGCS) for managing power transmission to a power grid from a plurality of power generation sources comprising:
   a plurality of electrical generation sources including a primary source comprising a solar photovoltaic cell (PV) system and a wind power generation system, a secondary source comprising a battery energy storage system (BESS) and a tertiary source comprising a fuel cell system operatively connected to an electrolyzer system;
   a DC-link connected to a power electronic converter of the HGCS, wherein the power electronic converter is connected to the power grid, wherein each of the plurality of electrical generations sources is connected to the DC-link, wherein the power electronic converter is configured to transmit power generated from the plurality of electrical generation sources to the power grid, wherein the DC-link is located between a rotor side converter (RSC) and a grid side converter (GSC);
   a voltmeter configured to measure the voltage between the positive rail and the negative rail of the DC-link;
   a power meter connected to the DC-link, wherein the power meter is configured to measure a net power in the DC-link;
   a controller connected to the power electronic converter, wherein the controller includes electrical circuitry, a memory storing program instructions and at least one processor configured to execute the program instructions to:
      maximize transmission of power to the power grid from the primary sources relative to the secondary source and the tertiary source via the GSC; a
      supply the net power to the power grid from the fuel cell system when the voltage of the BESS is less than a reference voltage of the DC-link; and
      use the power generated by at least one of the PV system and the wind power generation system for powering one of the BESS and the electrolyzer system based on the voltage of the DC-link being greater the reference voltage of the DC-link.

2. The HGCS system of claim 1, wherein the controller is configured to:
   receive the power generated by the PV system at the DC-link;
   receive the voltage of the DC-link;
   receive the net power of the DC-link;

calculate a sum of the powers of the PV system, the BESS, the wind power generation system and the fuel cell system;

compare the voltage of the DC-link to the reference voltage of the DC-link;

when the voltage at the DC-link is greater than less than a reference voltage of the DC-link, transmit the power generated by the PV system to the power grid via the GSC.

3. The HGCS system of claim 1, wherein the controller is further configured to:

use at least a portion of the net power to recharge the BESS based on a state of charge of the BESS being below a first threshold, and transmit a remaining portion of the net power to power the electrolyzer system when the state of charge of the BESS is equal to or exceeds the first threshold.

4. The HGCS system of claim 1, wherein the controller is further configured to:

supply the net power to the power grid from the BESS based on a state of charge of the BESS being within a specified range, and supply the net power to the power grid from the fuel cell system based on the state of charge of the BESS being outside of the specified range.

5. The HGCS system of claim 4, wherein the controller is further configured to:

supply the net power to the power grid from the BESS based on a state of charge of the BESS is in the specified range of greater than or equal to 20% and less than or equal to 80%, and supply the net power to the power grid from the fuel cell system based on the state of charge of the BESS is less than 20%; and supply the net power to the electrolyzer based on the state of charge of the BESS being greater than 80%.

6. The HGCS system of claim 4, wherein the controller is configured to power the electrolyzer system by the remaining portion of the net power to generate hydrogen and store the hydrogen in a hydrogen tank.

7. The HGCS system of claim 6, further comprising:

an anode of the fuel cell connected to receive oxygen from an air compressor;

a cathode of the fuel cell connected to receive hydrogen from the hydrogen tank;

wherein electricity generated by the fuel cell is supplied to the GSC and delivered to the power grid when the voltage of the DC-link is less than the reference voltage of the DC-link and the state of charge of the BESS is less than 20%.

8. The HGCS system of claim 7, further comprising:

a positive output terminal of the BESS connected to a first inductor, wherein the first inductor is connected to a positive input terminal of a DC/DC buck boost converter;

a negative output terminal of the BESS connected to a negative input terminal of the DC/DC buck boost converter;

a positive output terminal of the DC/DC buck boost converter connected to the positive rail of the DC-link;

a negative output terminal of the DC/DC buck boost converter connected to the negative rail of the DC-link;

a positive input terminal of a DC-DC buck converter connected to the positive rail of the DC-link;

a negative input terminal of the DC-DC buck converter connected to the negative rail of the DC-link;

a positive output terminal of the DC-DC buck converter connected to a second inductor;

an anode of the electrolyzer connected to the second inductor;

a negative output terminal of the DC-DC buck converter connected to a cathode of the electrolyzer, wherein the electrolyzer is configured to generate hydrogen and oxygen gases when the state of charge of the BESS is greater than 80%; and a hydrogen tank configured to store the hydrogen generated by the electrolyzer.

9. The HGCS system of claim 8, further comprising:

at least one wind turbine of the wind power generation system connected to an input terminal of a doubly fed induction generator (DFIG);

a first output terminal of the DFIG connected directly to the power grid;

a second output terminal of the DFIG connected to the RSC, wherein the RSC is connected to the DC-link based on one of the SOC of the BESS being less than the first threshold and a set of reactive components at the DC-link being less than or greater than a reactive reference threshold.

10. The HGCS system of claim 9, wherein:

the electrolyzer is selected from a group including a solid oxide electrolyzer, an alkaline electrolyzer, and a membrane electrolyzer; and the fuel cell system includes a solid oxide fuel cell.

11. A method of managing power transmission to a power grid from a hybrid grid connected system (HGCS), the HGCS including a plurality of electrical generation sources including a primary source comprising a solar photovoltaic cell (PV) system and a wind power generation system, a secondary source comprising a battery energy storage system (BESS) and a tertiary source comprising a fuel cell system operatively connected to an electrolyzer system, wherein each electrical generation source is connected to a DC-link of a power electronic converter connected to the power grid, wherein the power electronic converter is configured to transmit power generated by the plurality of electrical generation sources of the HGCS to the power grid, wherein the DC-link is connected between a rotor side converter (RSC) and a grid side converter (GSC), the method comprising:

receiving the power generated from the PV system at the DC-link and transmitting the power to the power grid via the GSC;

measuring, with a voltage meter, a voltage of the DC-link;

receiving, by the controller, the voltage of the DC-link;

measuring, with a power meter, a net power in the DC-link;

receiving, by the controller, the net power in the DC-link;

calculating, by the controller, a sum of the powers of the PV system, the wind power generation system, the BESS and the fuel cell system;

determining, by the controller, when the voltage at the DC-link is less than a reference voltage of the DC-link;

supplying the net power to the power grid from the fuel cell system when the voltage of the BESS is less than a reference voltage of the DC-link; and using the power generated by at least one of the PV system and the wind power generation system for powering one of the BESS and the electrolyzer system based on the voltage of the DC-link being greater the reference voltage of the DC-link.

12. The method of claim 11, wherein supplying the net power to power at least one of the BESS and the electrolyzer system includes:
using at least a portion of the net power to recharge the BESS based on a state of charge of the BESS being below a first threshold, and
transmitting a remaining portion of the net power to power the electrolyzer system when the state of charge of the BESS is equal to or exceeds the first threshold.

13. The method of claim 11, wherein supplying the net power to the power grid includes:
supplying the net power to the power grid from the BESS based on a state of charge of the BESS being within a specified range, and
supplying the net power to the power grid from the fuel cell system based on the state of charge of the BESS being outside of the specified range.

14. The method of claim 13, further comprising:
supplying the net power to the power grid from the BESS based on a state of charge of the BESS being in the specified range of greater than or equal to 20% and less than or equal to 80%, and
supplying the net power to the power grid from the fuel cell system based on the state of charge of the BESS being less than 20%; and
supplying the net power to the electrolyzer based on the state of charge of the BESS being greater than 80%.

15. The method of claim 14, wherein supplying the net power to the electrolyzer system includes:
using the remaining portion of the net power by the electrolyzer system to generate hydrogen; and
storing the hydrogen in a hydrogen tank for supplying to the fuel cell system.

16. The method of claim 14, further comprising:
connecting an anode of the fuel cell to receive oxygen from an air compressor;
connecting a cathode of the fuel cell to receive hydrogen from the hydrogen tank;
generating electricity by the fuel cell; and
supplying the electricity generated by the fuel cell to the GSC for delivering to the power grid when the voltage of the DC-link is less than the reference voltage of the DC-link and the state of charge of the BESS is outside of the specified range.

17. The method of claim 11, further comprising:
connecting a positive output terminal of the BESS to a first inductor and connecting the first inductor to a positive input terminal of a DC/DC buck boost converter;
connecting a negative output terminal of the BESS to a negative input terminal of the DC/DC buck boost converter;
connecting a positive output terminal of the DC/DC buck boost converter to a positive rail of the DC-link;
connecting a negative output terminal of the DC/DC buck boost converter to a negative rail of the DC-link;

connecting a positive input terminal of a DC-DC buck converter to the positive rail of the DC-link;
connecting a negative input terminal of the DC-DC buck converter to the negative rail of the DC-link;
connecting a positive output terminal of the DC-DC buck converter to a second inductor and connecting the second inductor to an anode of the electrolyzer;
connecting a negative output terminal of the DC-DC buck converter to a cathode of the electrolyzer;
generating, by the electrolyzer, hydrogen and oxygen gases when the state of charge of the BESS is greater than 80%; and
storing the hydrogen in the hydrogen tank.

18. The method of claim 17, further comprising:
connecting at least one wind turbine of the wind power generation system to an input terminal of a doubly fed induction generator (DFIG);
connecting a first output terminal of the DFIG directly to the power grid;
connecting a second output terminal of the DFIG to the RSC; and
connecting the RSC to the DC-link based on one of the SOC of the BESS being less than the first threshold and a set of reactive components at the DC-link being less than or greater than a reactive reference threshold.

19. A method for connecting a plurality of electrical generation sources to a power grid, comprising:
connecting a solar photovoltaic cell (PV) system and a wind power generation system to a DC-link of the power grid as primary sources,
connecting a battery energy storage system ("BESS") to the DC-link as a secondary source;
connecting a fuel cell system to the DC-link as a tertiary source, wherein the fuel cell system includes an electrolyzer system configured for generating hydrogen gas as a feed gas for the fuel cell system;
maximizing, by a power electronic converter, transmission of power to the power grid from the primary sources relative to the secondary source and the tertiary source based on a state of charge (SoC) of the BESS.

20. The method of claim 19, further comprising:
measuring, with a voltmeter, a voltage of the DC-link;
measuring, with a power meter, a net power in the DC-link;
supplying, by the power converter, the power generated by the primary sources to the power grid when the voltage at the DC-link is less than a reference voltage of the DC-link;
when the power generated by the primary sources is less than a reference net power, supplying, by the power converter, power stored in the BESS to the DC-link;
when the SoC of the BESS is less than a first reference SoC, supplying the power generated by the fuel cell system to the DC-link; and
when the SoC of the BESS is greater than a second reference SoC, supplying a remaining power of the BESS to the electrolyzer system to generate hydrogen gas and storing the hydrogen gas in a hydrogen tank.

* * * * *